(12) United States Patent
Gardella, Jr. et al.

(10) Patent No.: US 6,329,470 B1
(45) Date of Patent: Dec. 11, 2001

(54) FLUOROCARBON END-CAPPED POLYMERS AND METHOD OF SYNTHESIS

(75) Inventors: Joseph A. Gardella, Jr., Buffalo; Wesley Hicks, Jr., Angola; Timothy Koloski, Amherst, all of NY (US); Ilario Losito, Molfetta (IT); Won-Ki Lee, Pusan (KR); Terrence G. Vargo, Kenmore, NY (US)

(73) Assignee: The Research Foundation of State University of New York, Amherst, NY (US)

( * ) Notice: Subject to any disclaimer, the term of this patent is extended or adjusted under 35 U.S.C. 154(b) by 0 days.

(21) Appl. No.: 09/675,905

(22) Filed: Sep. 29, 2000

Related U.S. Application Data

(60) Provisional application No. 60/157,178, filed on Sep. 30, 1999.

(51) Int. Cl.[7] .................. C08F 259/08; C08F 18/02
(52) U.S. Cl. .................. 525/276; 525/326.3; 526/245; 526/246; 526/250; 526/255
(58) Field of Search .................. 526/245, 246, 526/250, 255; 525/276, 326.3

(56) References Cited

U.S. PATENT DOCUMENTS 5,236,563 * 8/1993 Loh .................. 424/426

* cited by examiner

Primary Examiner—Samuel A. Acquah
Assistant Examiner—Olga Asinovsky
(74) Attorney, Agent, or Firm—Hodgson Russ LLP

(57) ABSTRACT

The present invention provides novel surface modified biodegradable polyesters having fluorocarbon chains at the terminal end of the polyesters. The compounds of the present invention are obtained by the addition of fluorocarbon chains at the surface of the polyester. Any commonly used polyester material can be used in the present invention; however, polyglycolic or polylactic acids or co-polymers thereof are preferred.

19 Claims, 36 Drawing Sheets

FLUOROCARBON END-CAPPED POLYMERS AND METHOD OF SYNTHESIS

CLAIM OF PRIORITY

This application claims priority to U.S. provisional patent application No. 60/157,178, filed on Sep. 30, 1999.

RESEARCH FUNDING SOURCE

This invention was made with Government support under Grant Number N00014-99-1-0369 awarded by the Department of Navy. The Government has certain rights in the invention. This invention was also made with funds from the National Science Foundation, Grant Number CHE 9704996.

FIELD OF THE INVENTION

The present invention relates generally to biodegradable polymers.

DESCRIPTION OF RELATED ART

Biodegradable polyester polymers based on simple biological acid compounds, such as glycolic or lactic acid are among an important class of biodegradable materials used temporarily as sutures, tissue scaffolding, wound healing and drug delivery devices/matrices. The polyesters traditionally of greatest interest are derived from lactide and glycolide. These compounds, however, lack many desirable properties like specific controlled cellular or tissue adhesion properties, biocompatibility, and drug delivery kinetics. Therefore, a need exists in the field of biodegradable polymers for novel compounds that will display these and other desired surface properties.

SUMMARY OF THE INVENTION

The present invention provides novel surface modified biodegradable polyesters having fluorocarbon chains at the terminal end of the polyesters. The compounds of the present invention are obtained by the addition of fluorocarbon chains at the surface of the polyester. Any commonly used polyester material can be used in the present invention; however, polyglycolic or polylactic acids or co-polymers thereof are preferred.

BRIEF DESCRIPTION OF THE DRAWINGS

FIGS. 2b–2m are representations of the atomic percentage as a function of take-off angle for various moieties for the structure in FIG. 2a.

FIGS. 3b–3j are representations of the atomic percentage as a function of take-off angle for various moieties for the structure in FIG. 3a.

DESCRIPTION OF PREFERRED EMBODIMENTS

The compounds of the present invention have been synthesized on the principles of surface segregation for defined surface chemistry. Fluorocarbon chains of various lengths of carbon have been synthesized as the terminal end groups to polyglycolic acids ("PGA"), polylactic acids (d,l) ("PLA") and poly(lactic-co-glycolic) acid copolymers ("PLGA"). The fluorocarbon chains can be added using ring opening polymerization methods or insertion/substitution of the fluorocarbon at a terminal hydroxyl compound. Thus, synthesized polymer chains with 1, 2 and 4 fluorocarbon end groups of differing molecular weights can be produced. Various sample preparation methods produce surface segregation of the fluorocarbon chains to an extent where the entire surface is dominated by the end groups, creating a material with surface properties associated with fluorocarbons such as low water wettability, low surface energy, and reactivity towards other surface modifications. This efficient refunctionalization of the surface with fluorocarbons produces a surface with bulk properties controlled by the characteristics of the PGA, PLA or PLGA material.

Fluorocarbon chains to be added to the polyester can be up to 18 carbons in length. In a preferred embodiment, the length is from 7 to 10 carbons. Those skilled in the art will recognize that the upper limit of the length of the fluorocarbon chain suitable for the present invention is guided by the solubility of the chains.

For the synthesis of fluorocarbon end-capped polyesters, l- and dl-lactide (Aldrich Chemical Co.) were recrystallized from anhydrous ethyl acetate. Pentadecafluoro-1-octanol (F7C1), 1,6-hexanediol, 2-(perfluorodecyl) ethanol (F10C2) (Daikin), and pentaerythrithol (Aldrich) were dried in vacuum oven before use. Glycolide (Polysciences), decyl alcohol (Aldrich), heptafluorobutyryl chloride (F3), pentadecafluorooctanoyl chloride (F7) (Aldrich), and stannous octoate (Sigma) were used as received. All other chemicals were of reagent grade and were not used without further purification.

Figure 1:
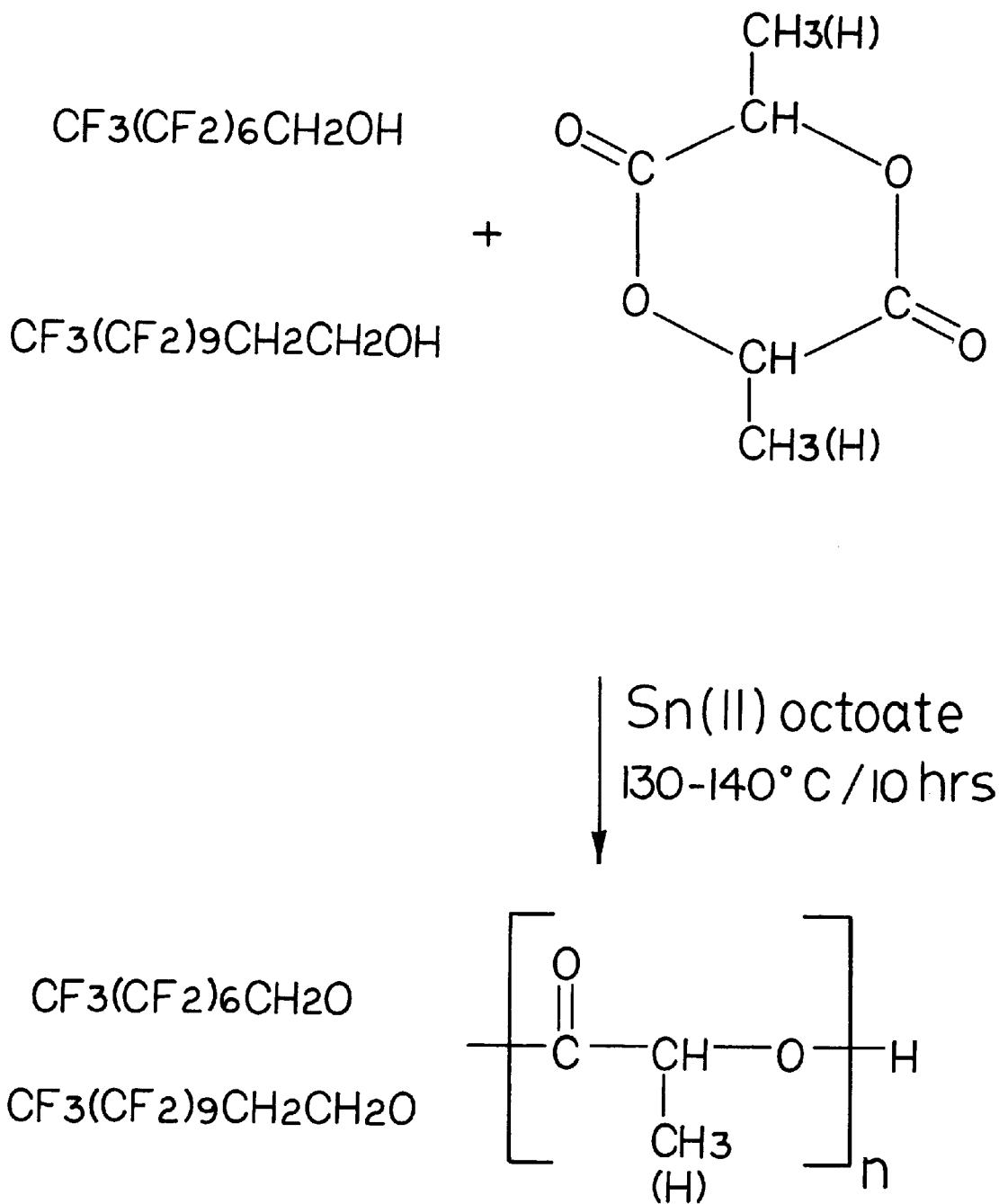
FIG. 1 is a schematic illustration of the method of preparation of the compounds of the present invention.
Figure 2A:
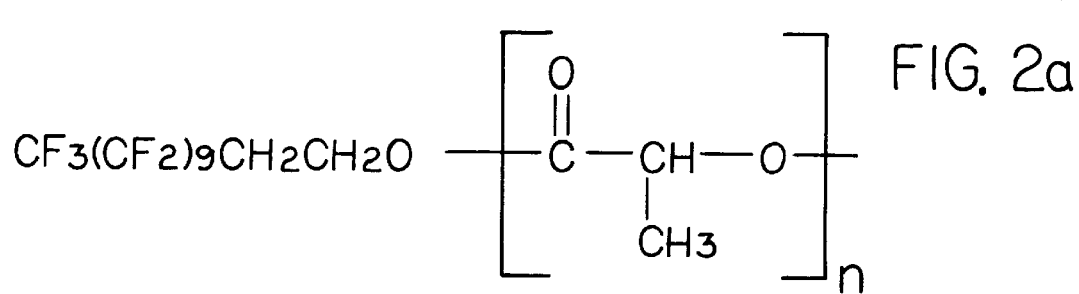
FIG. 2a is a representation of a compound of the present invention.
Figure 2B:
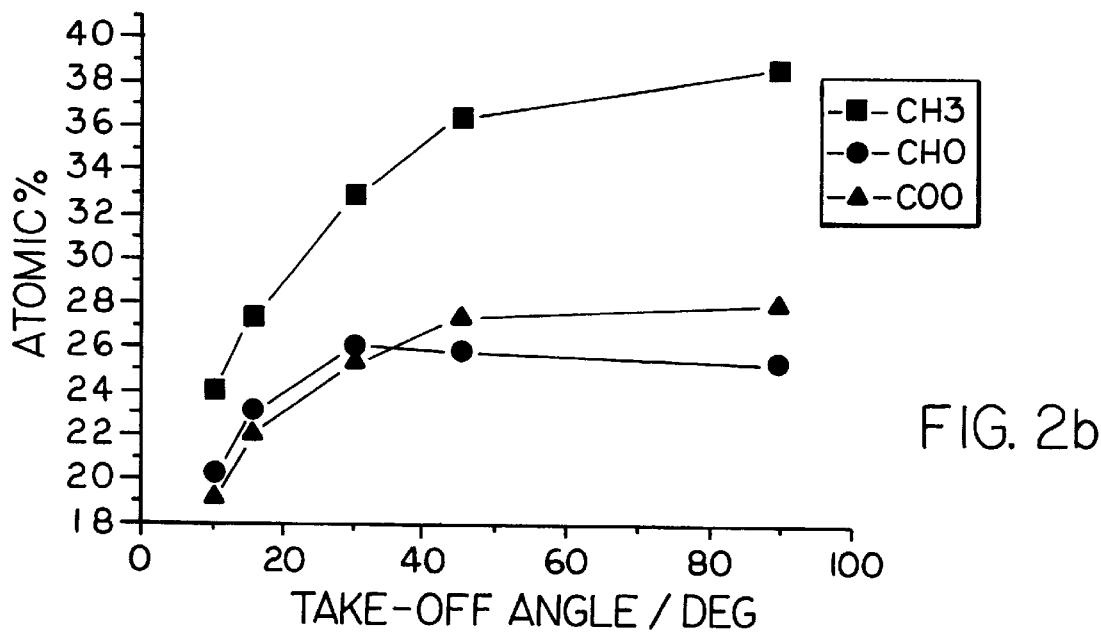
Figure 2C:
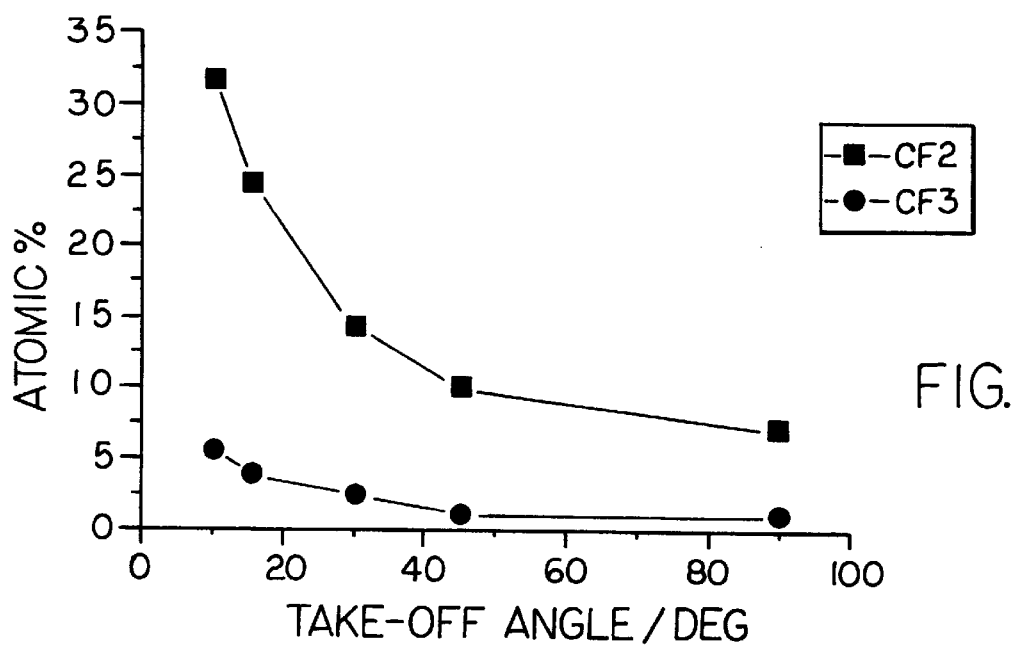
Figure 2D:
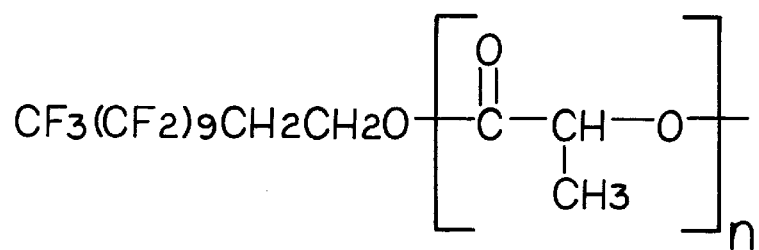
Figure 2D:
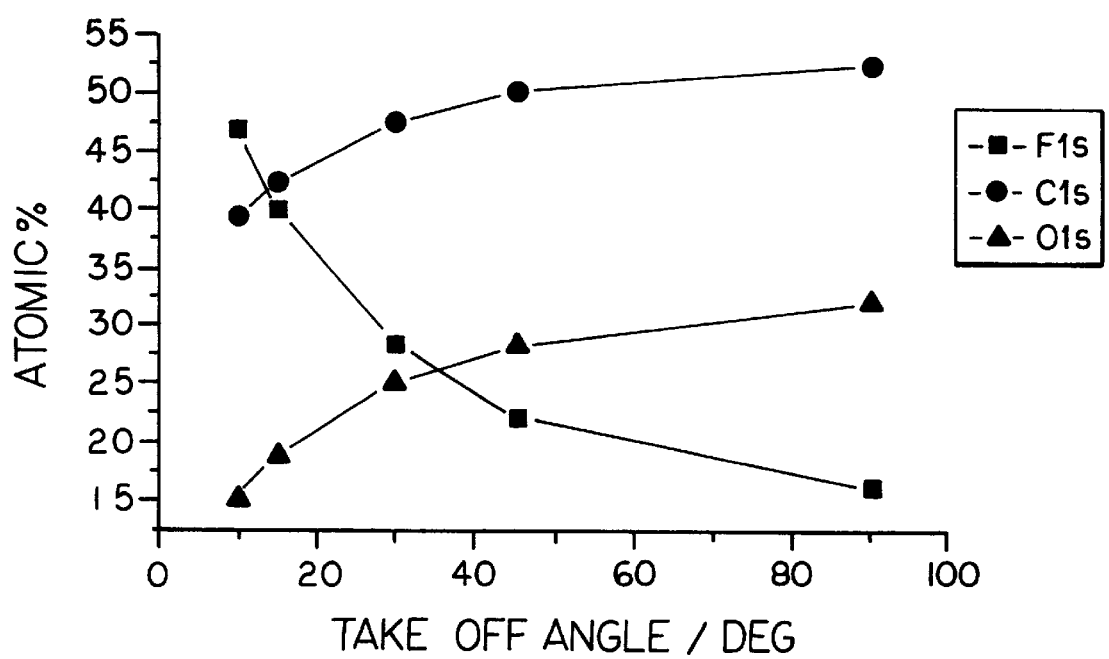
Figure 2E:
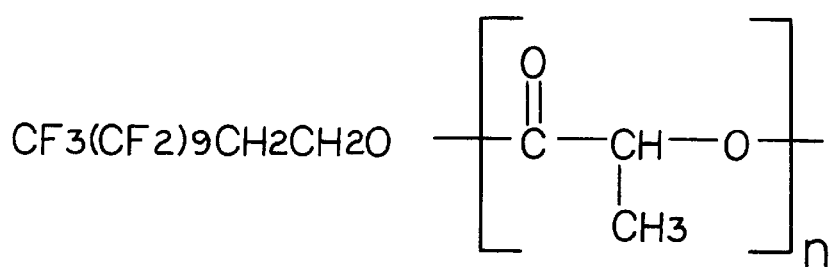
Figure 2F:
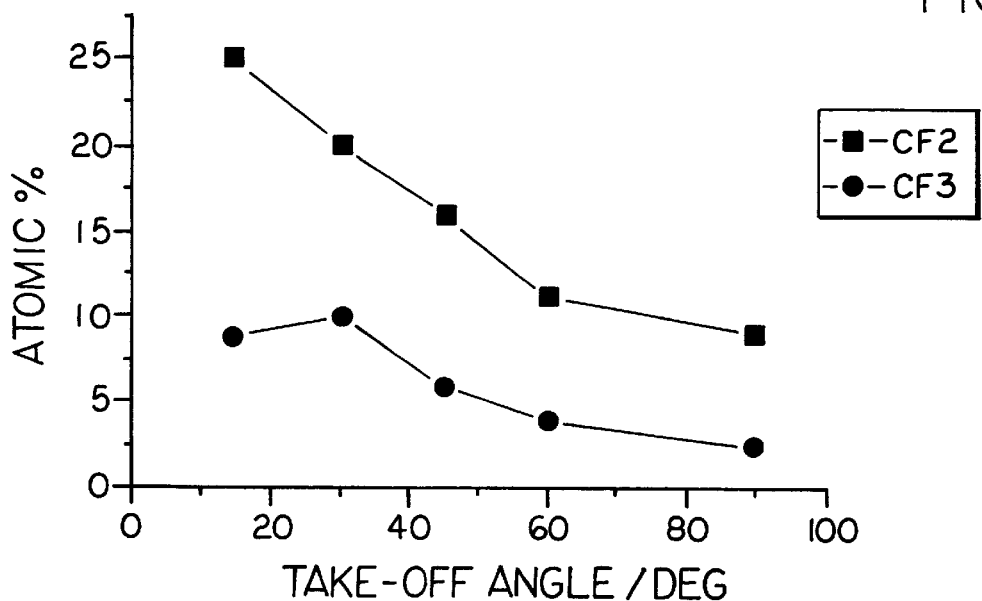
Figure 2F:
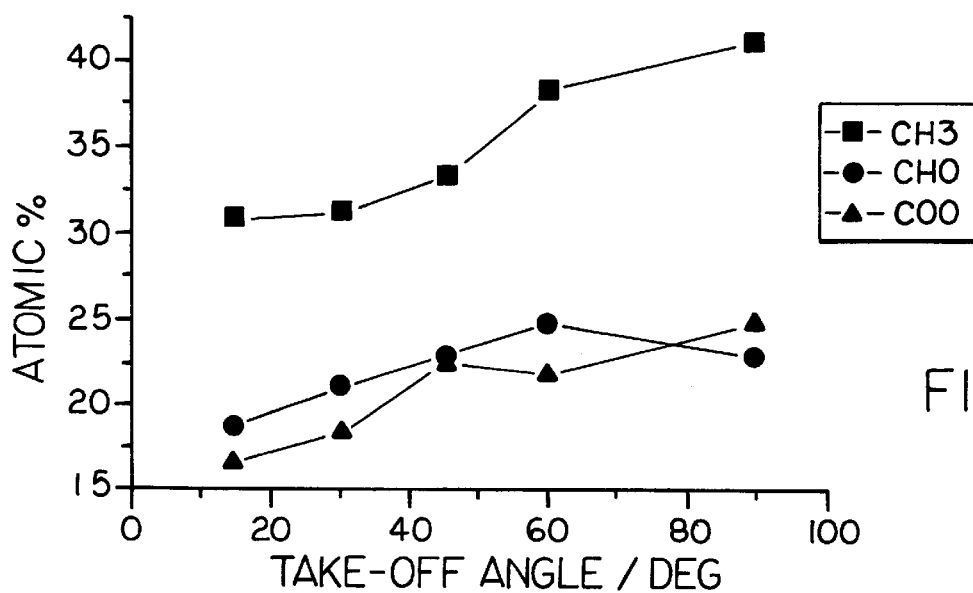
Figure 2G:
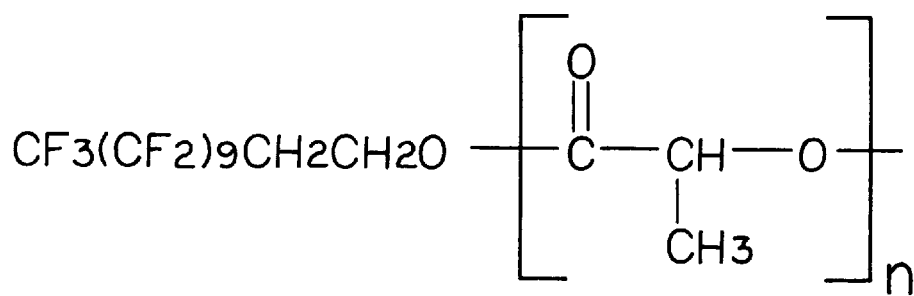
Figure 2G:
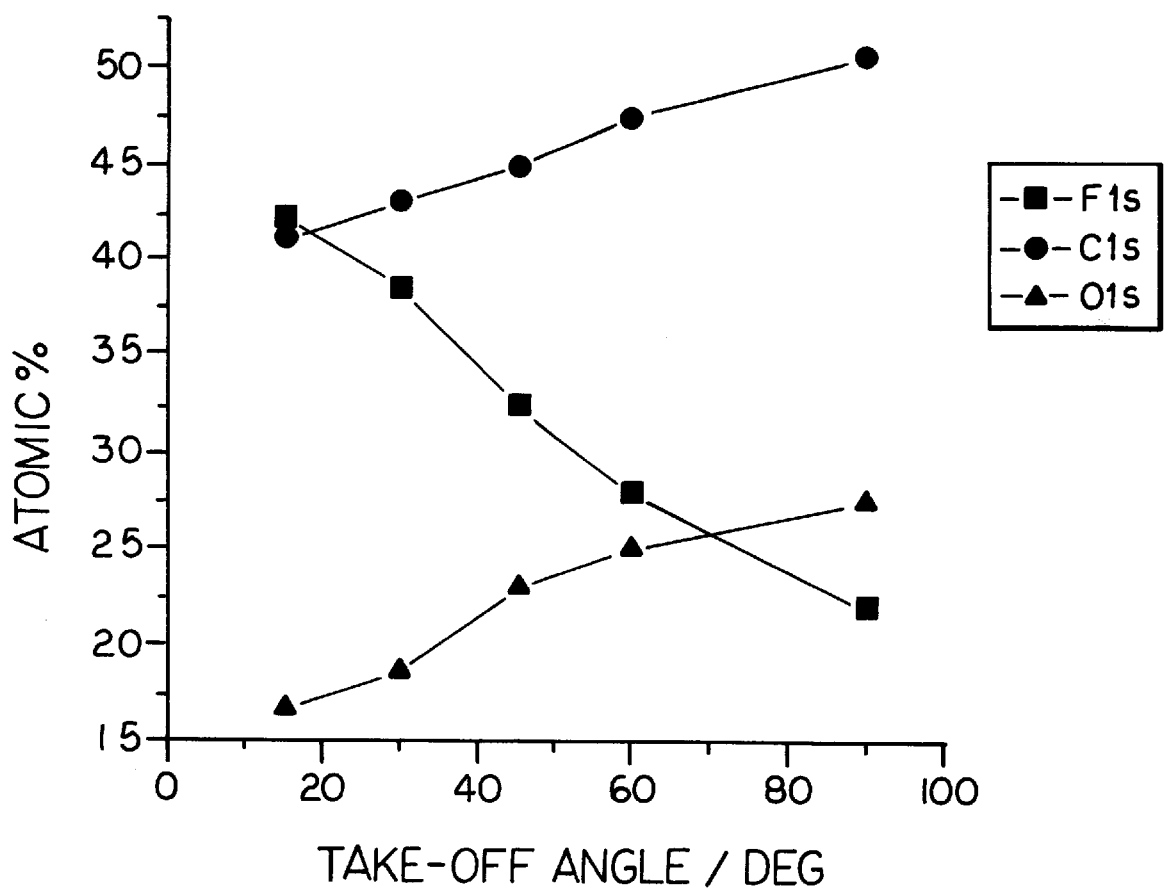
Figure 2H:
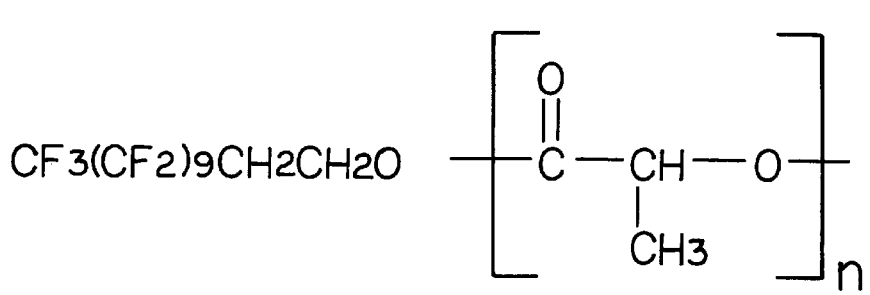
Figure 2H:
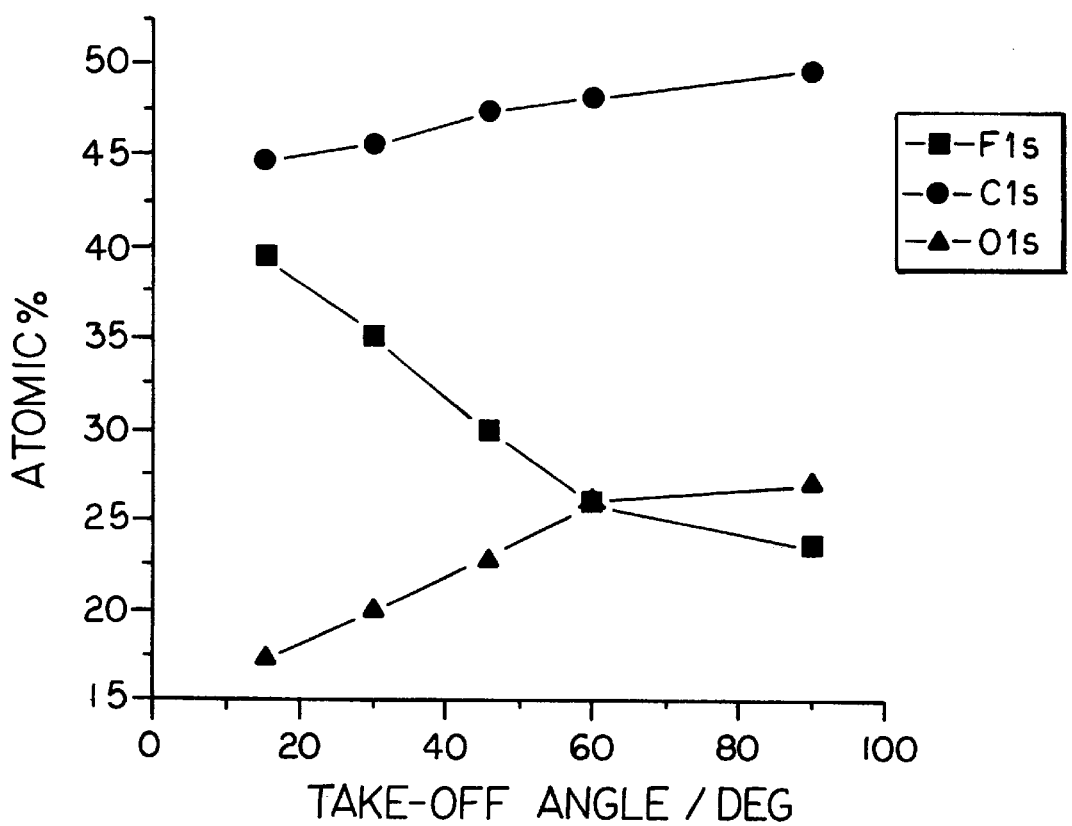
Figure 2I:
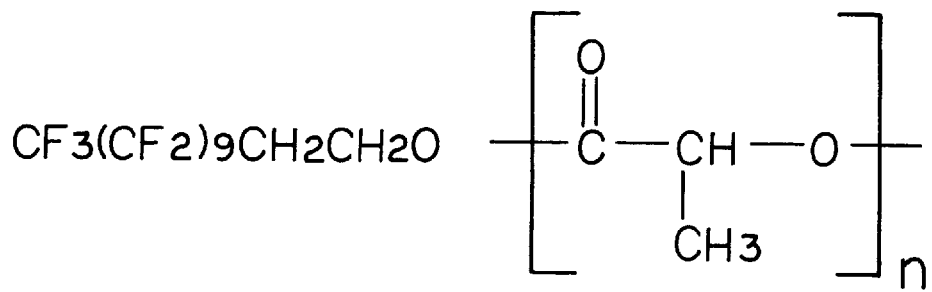
Figure 2I:
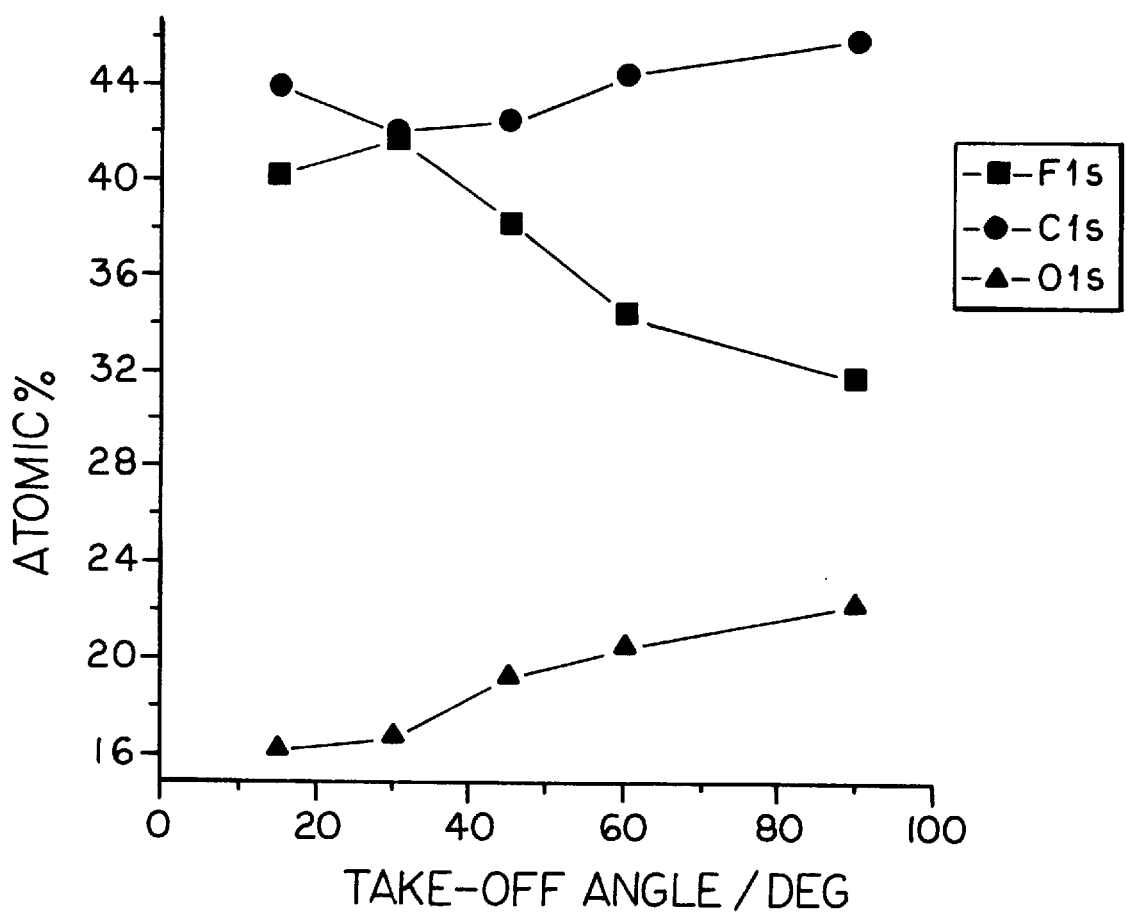
Figure 2J:
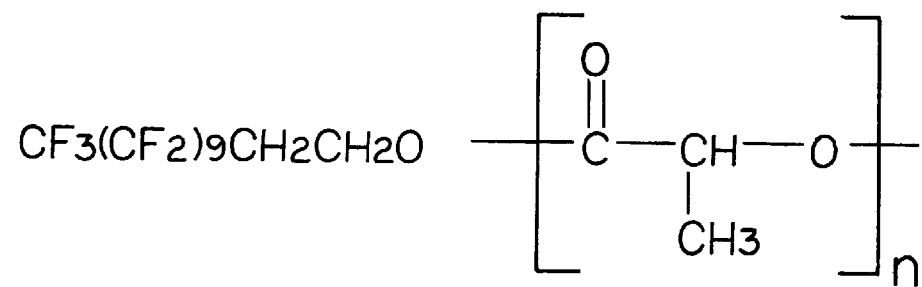
Figure 2J:
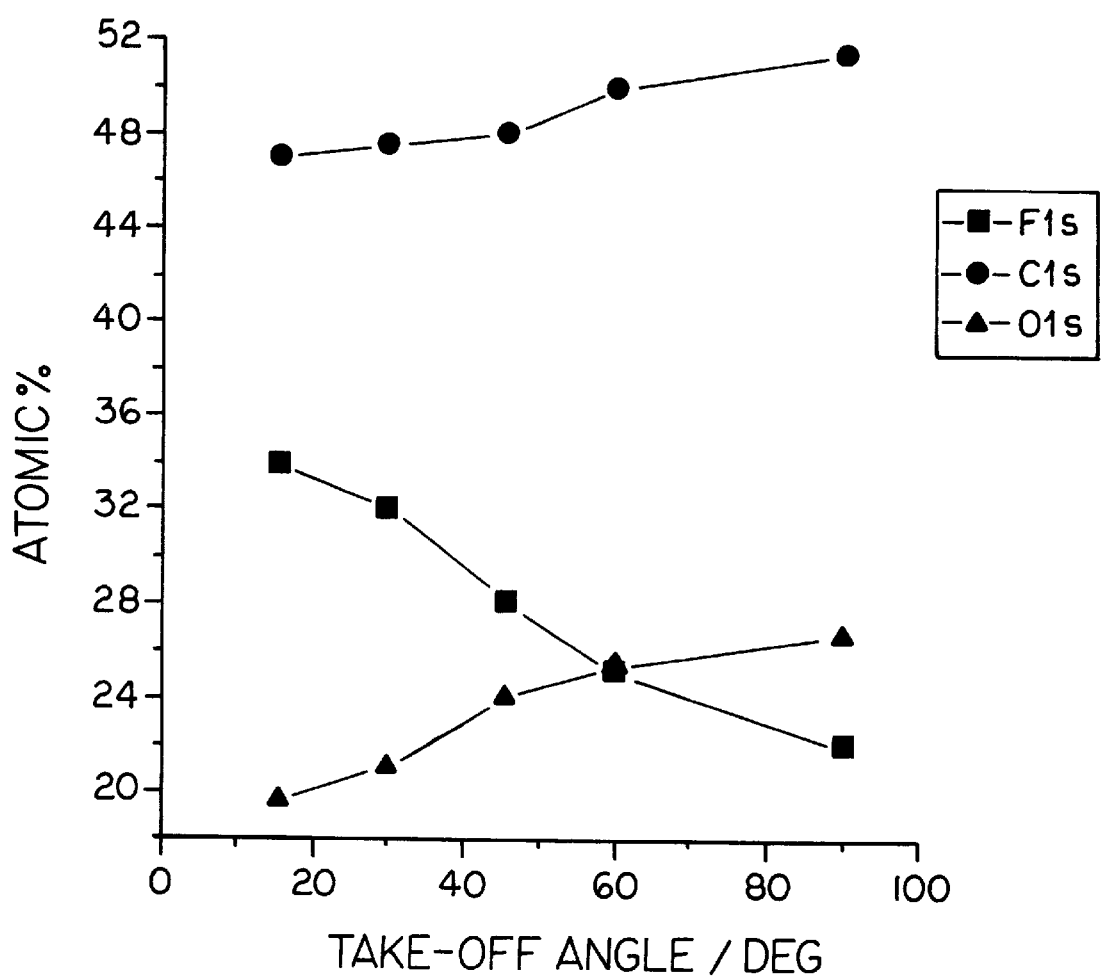
Figure 2K:
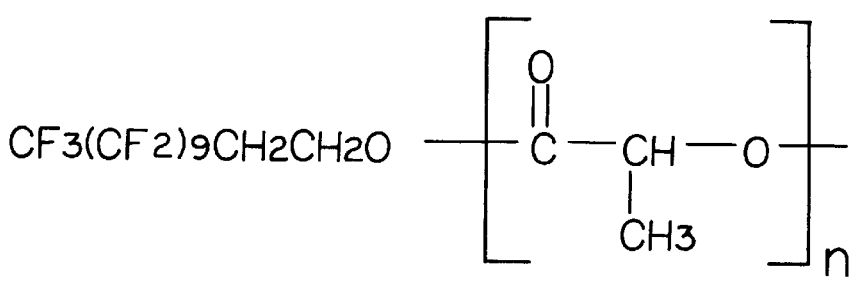
Figure 2K:
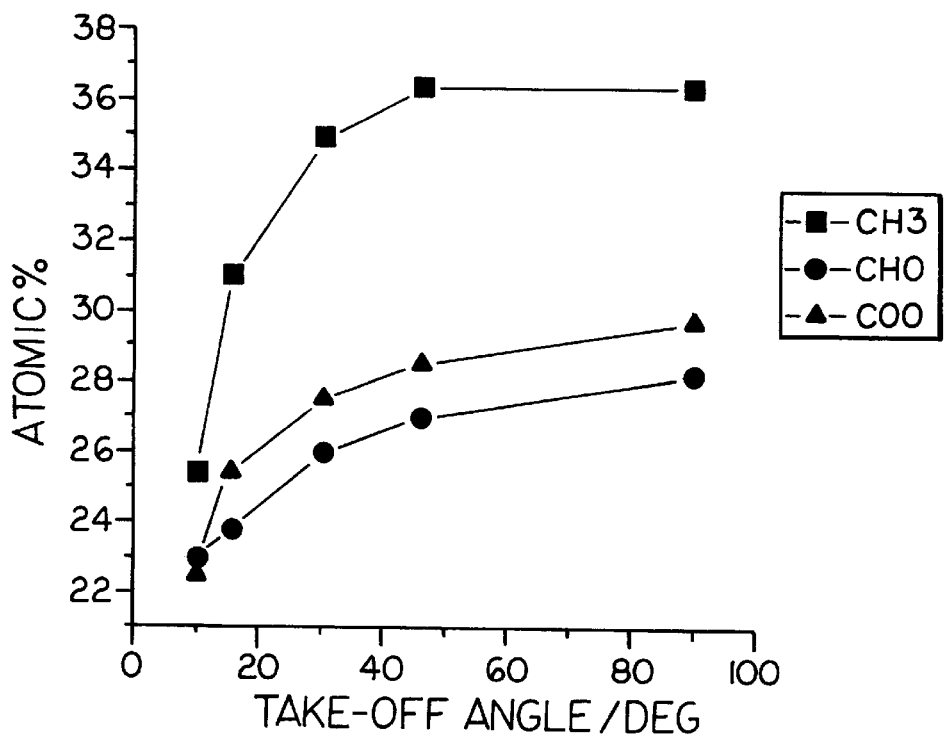
Figure 2L:
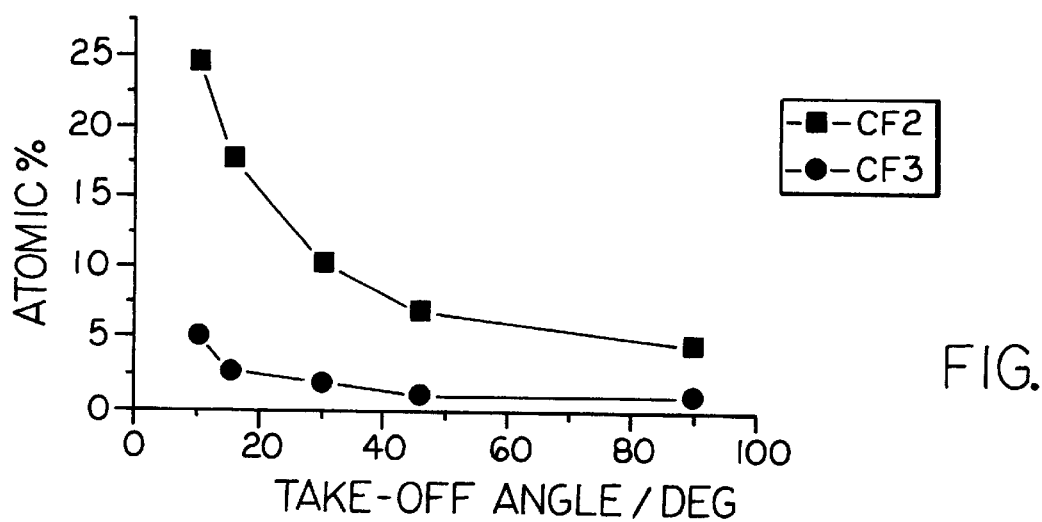
Figure 2M:
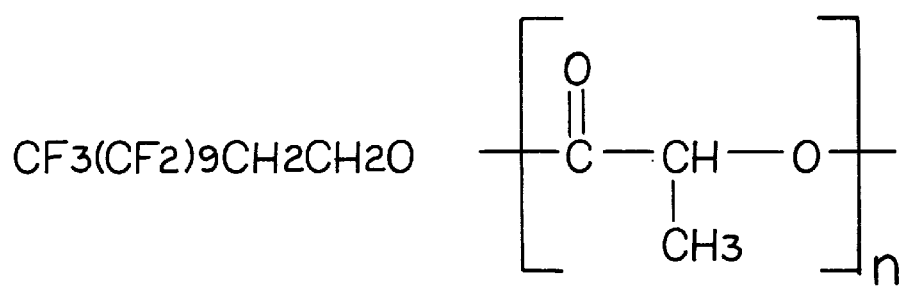
Figure 2M:
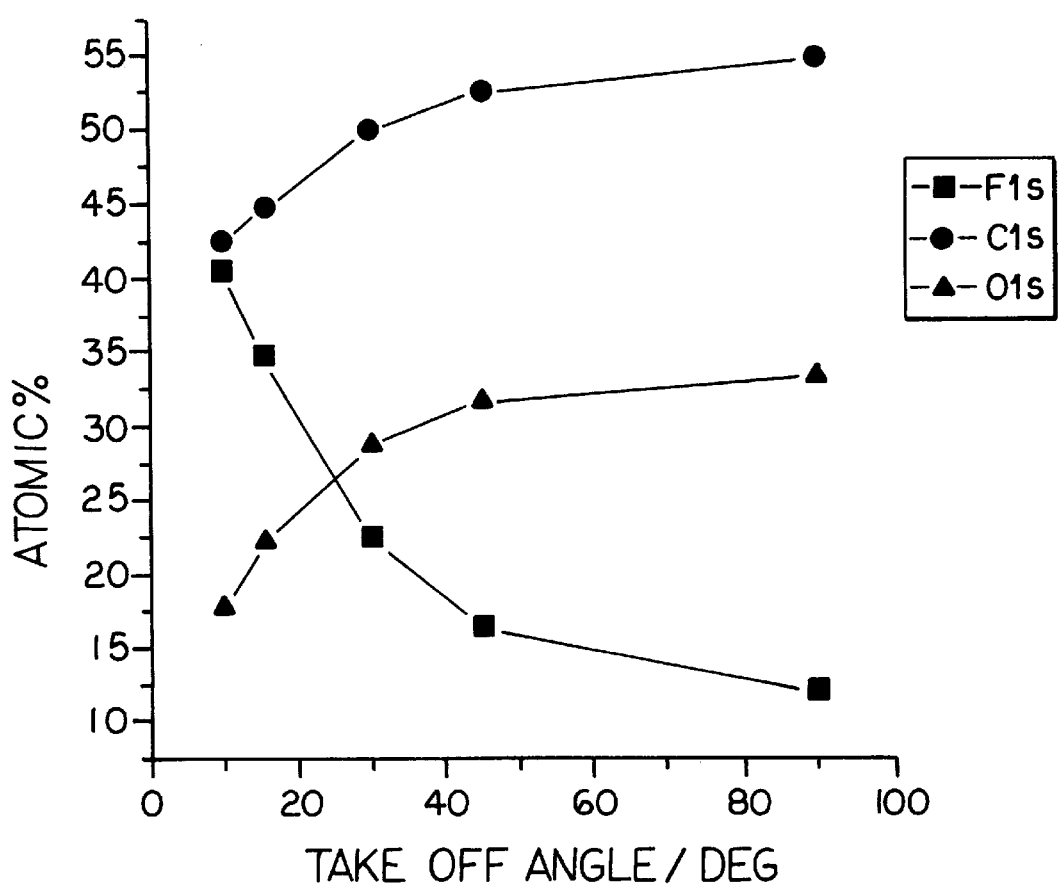
Figure 3A:
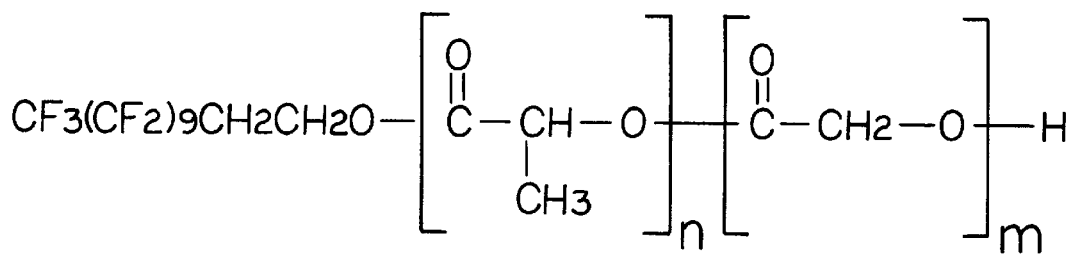
FIG. 3a is a representation of another compound of the present invention.
Figure 3B:
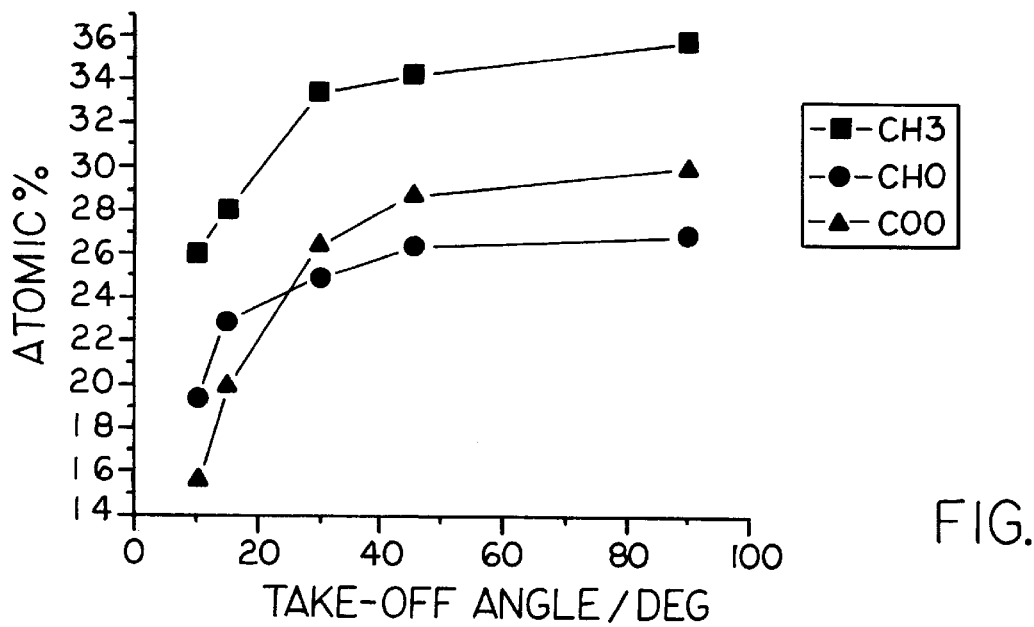
Figure 3C:
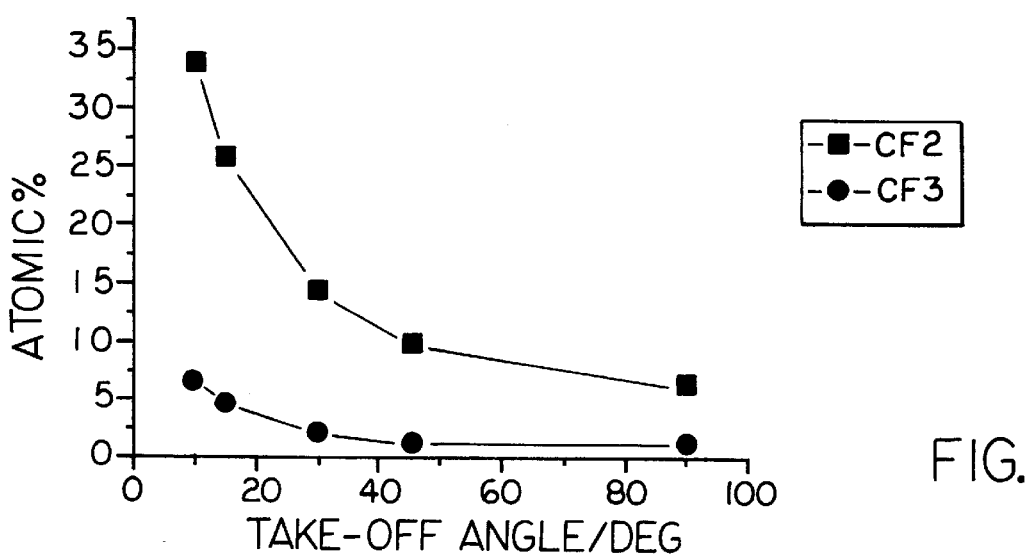
Figure 3D:
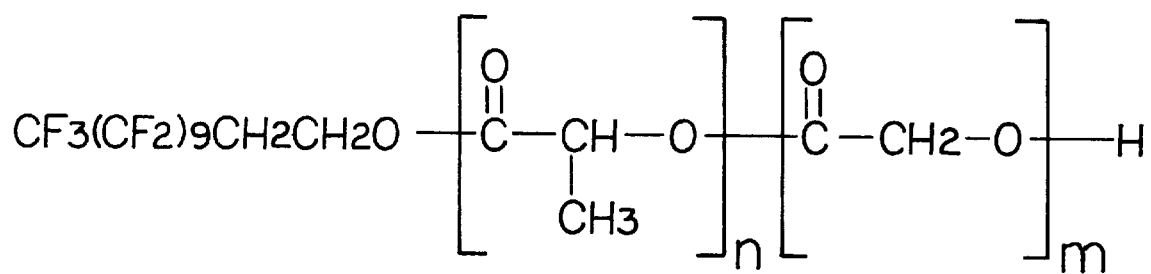
Figure 3D:
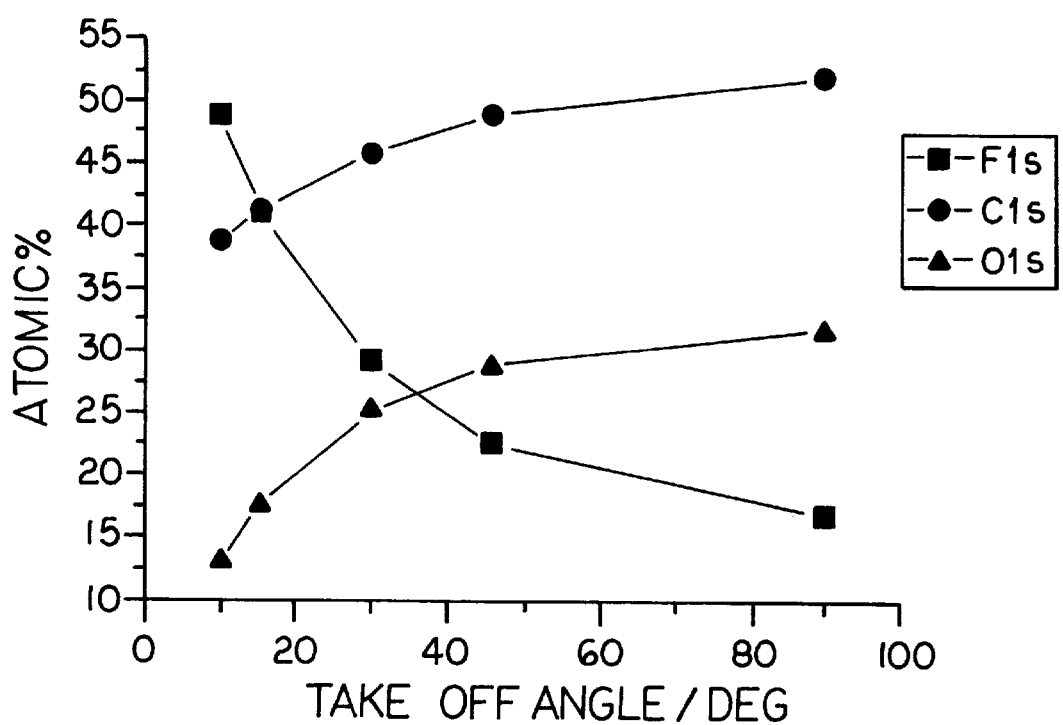
Figure 3E:
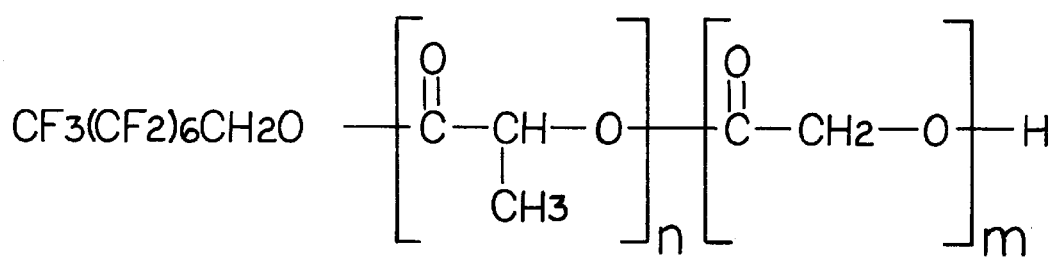
Figure 3E:
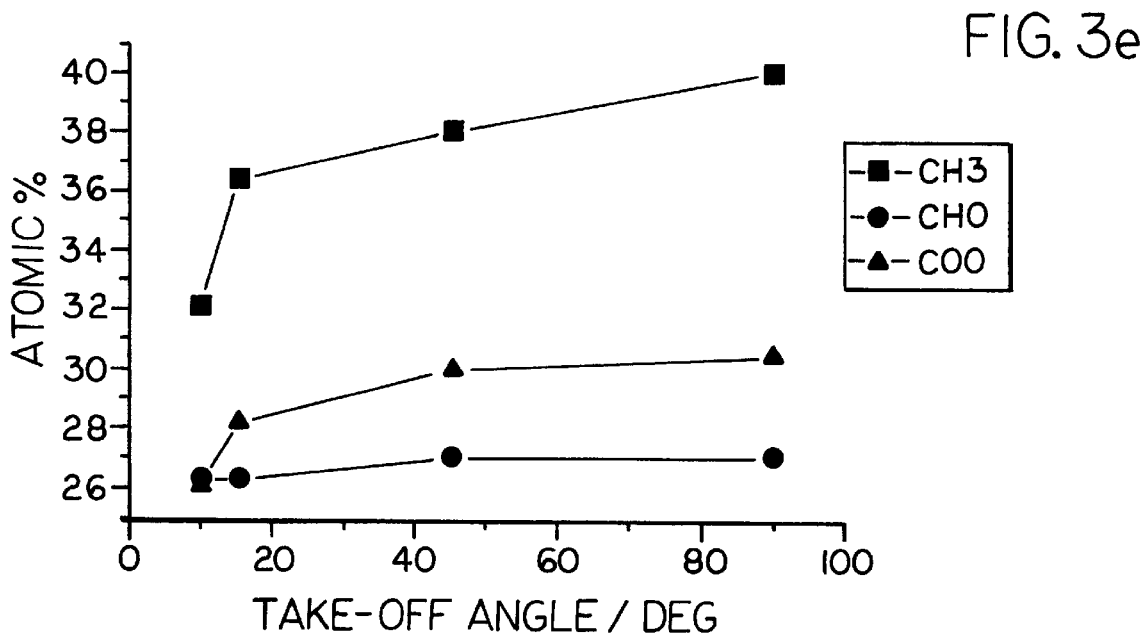
Figure 3F:
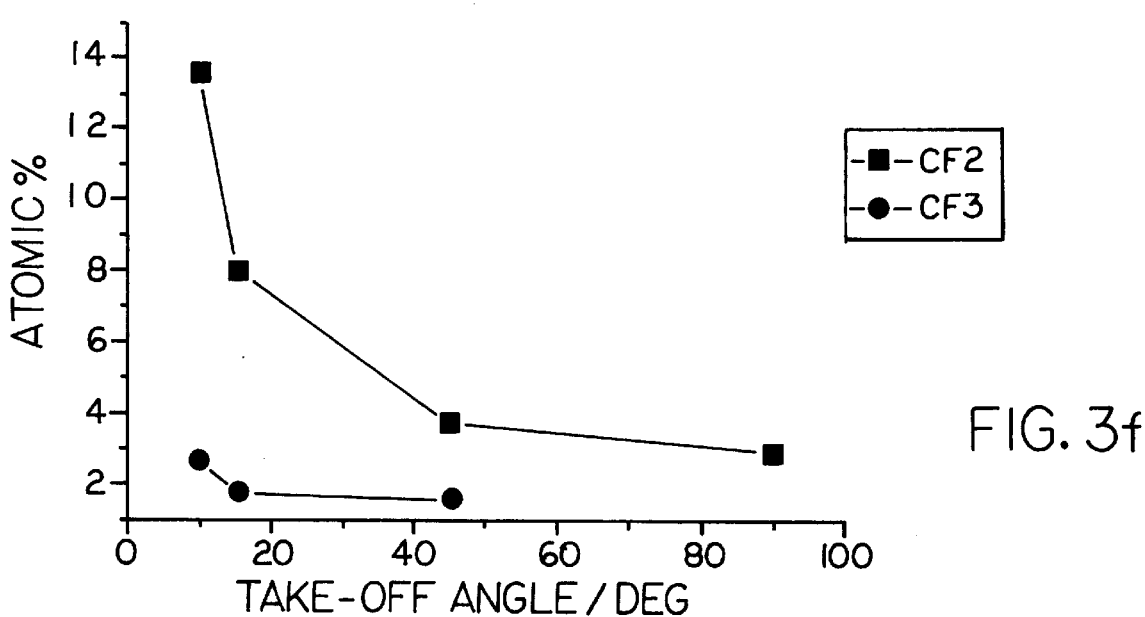
Figure 3G:
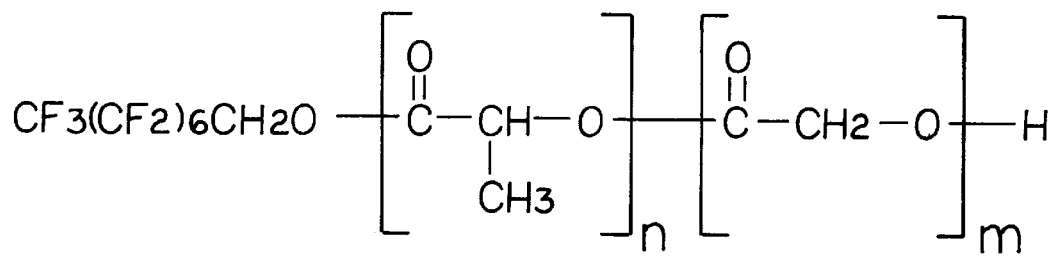
Figure 3G:
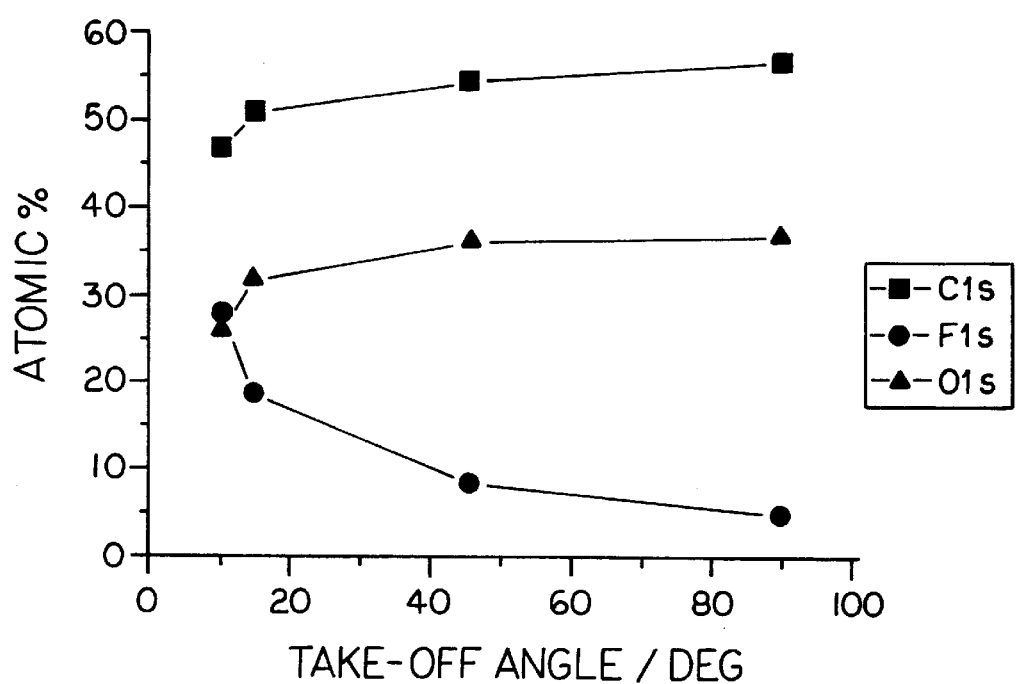
Figure 3H:
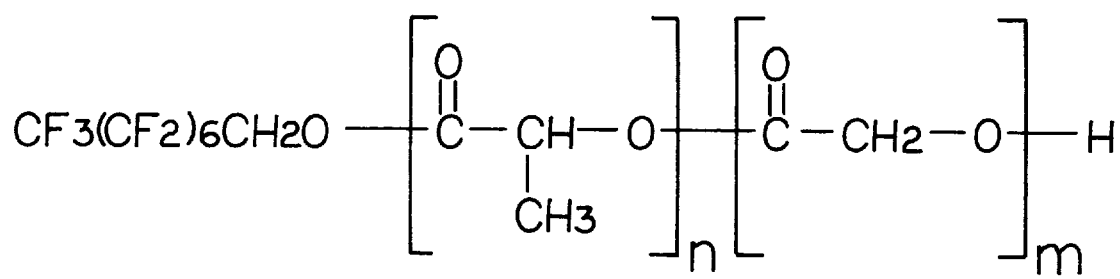
Figure 3H:
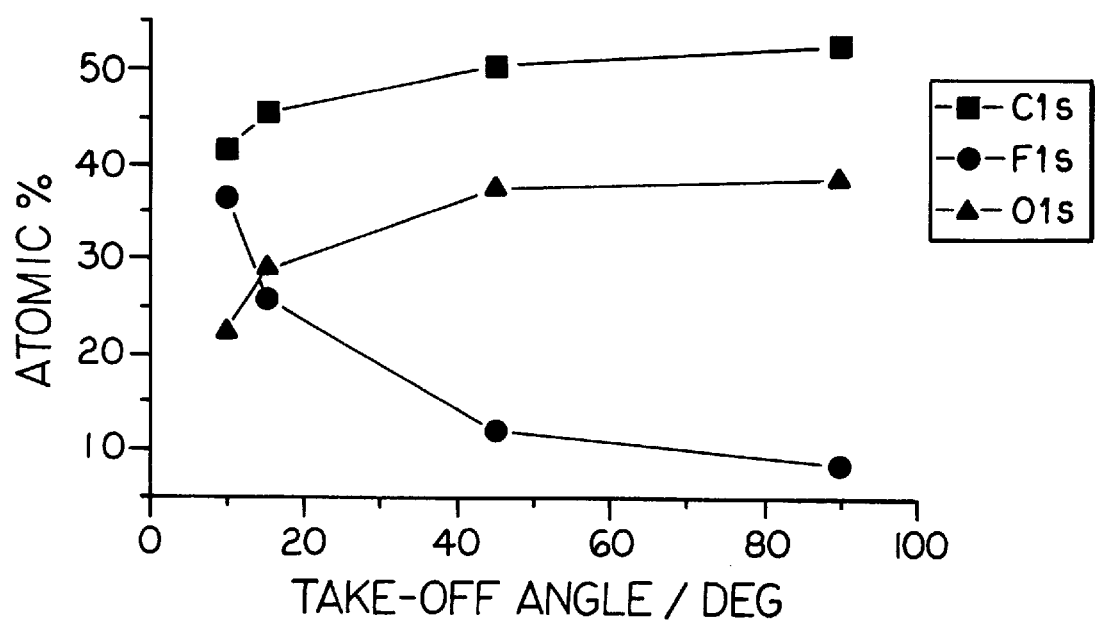
Figure 3I:
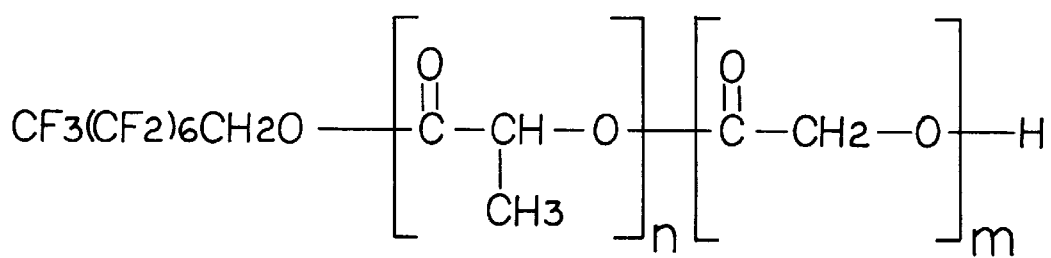
Figure 3I:
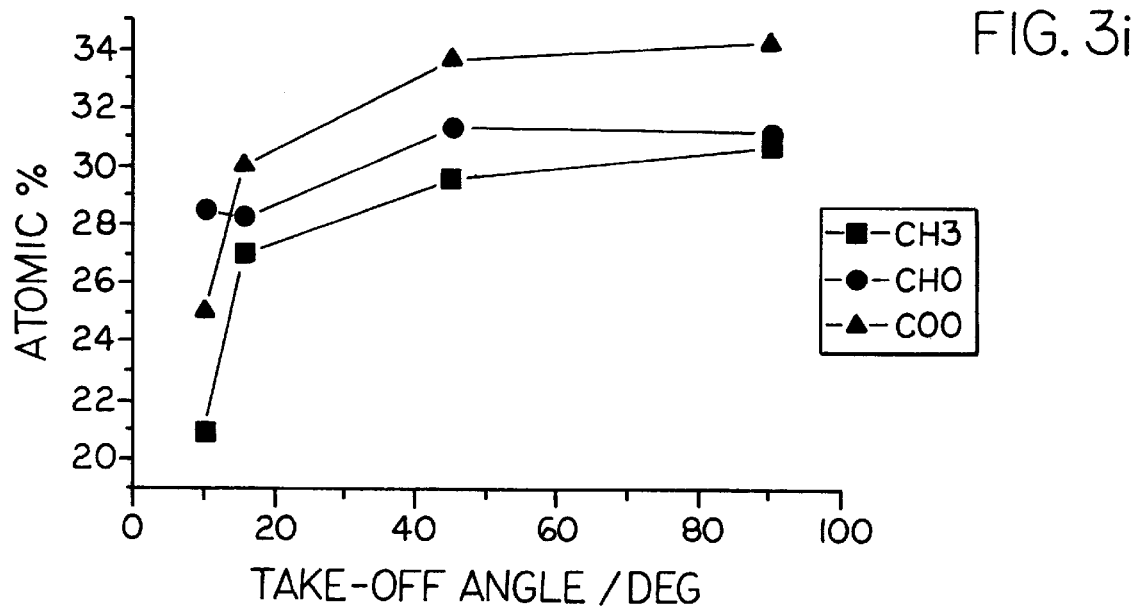
Figure 3J:
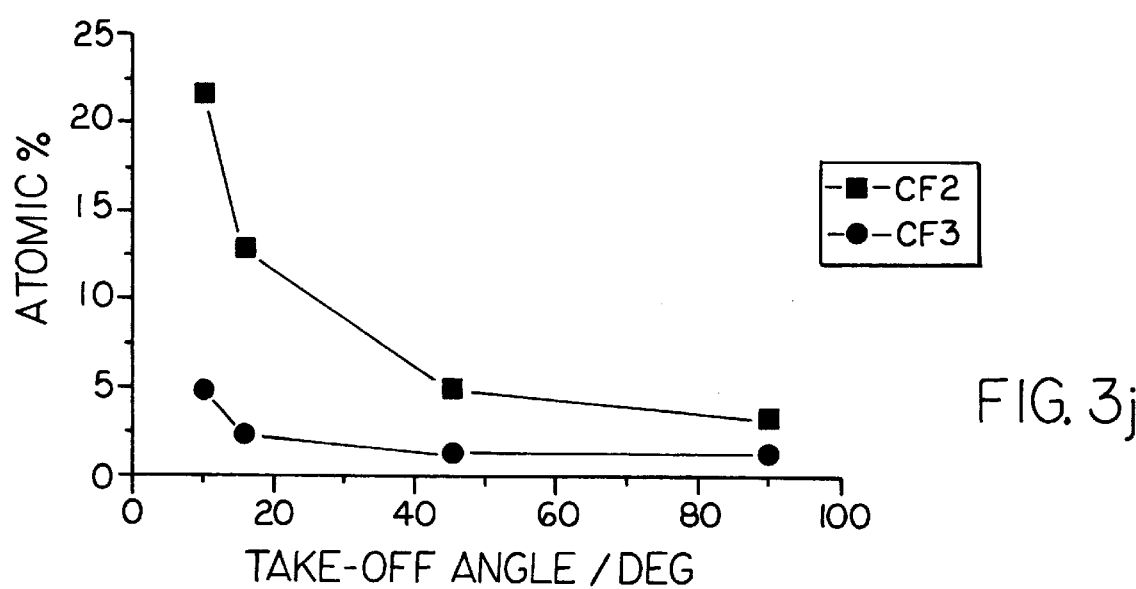
Figures 4A, 4B, 4C:
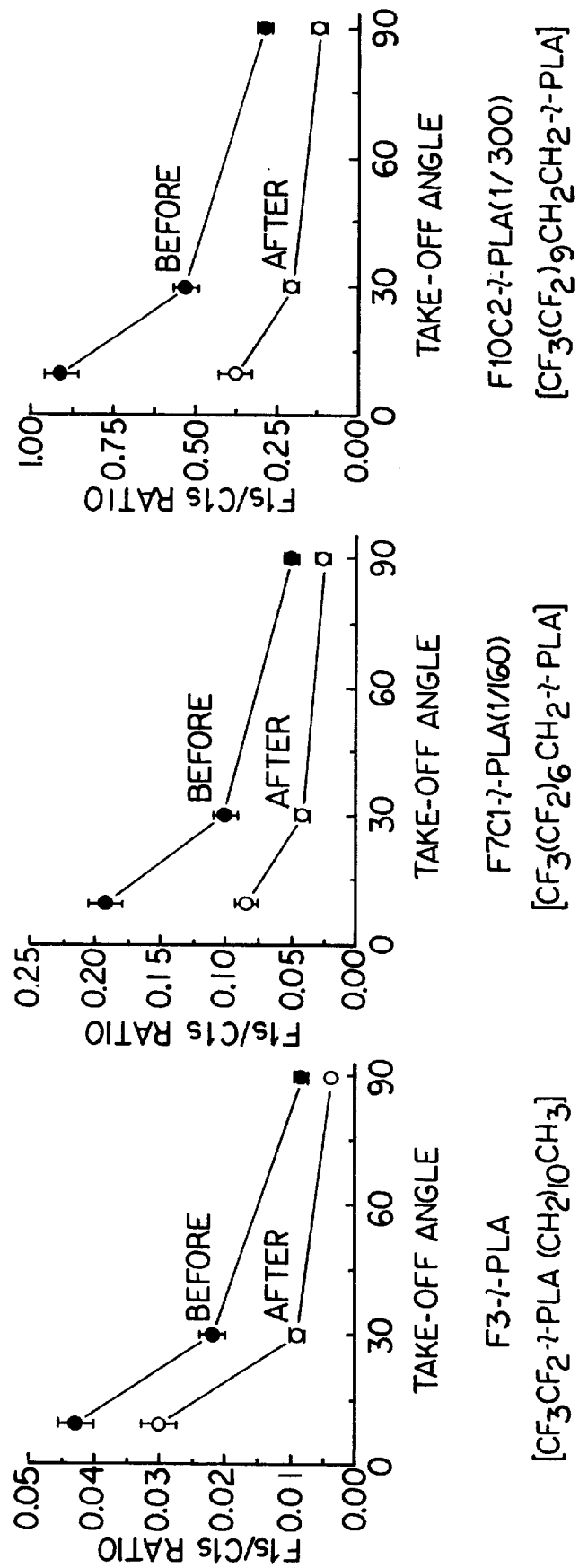
FIGS. 4a–4c are representations of the surface atomic composition of compounds of the present invention.
Figure 5:
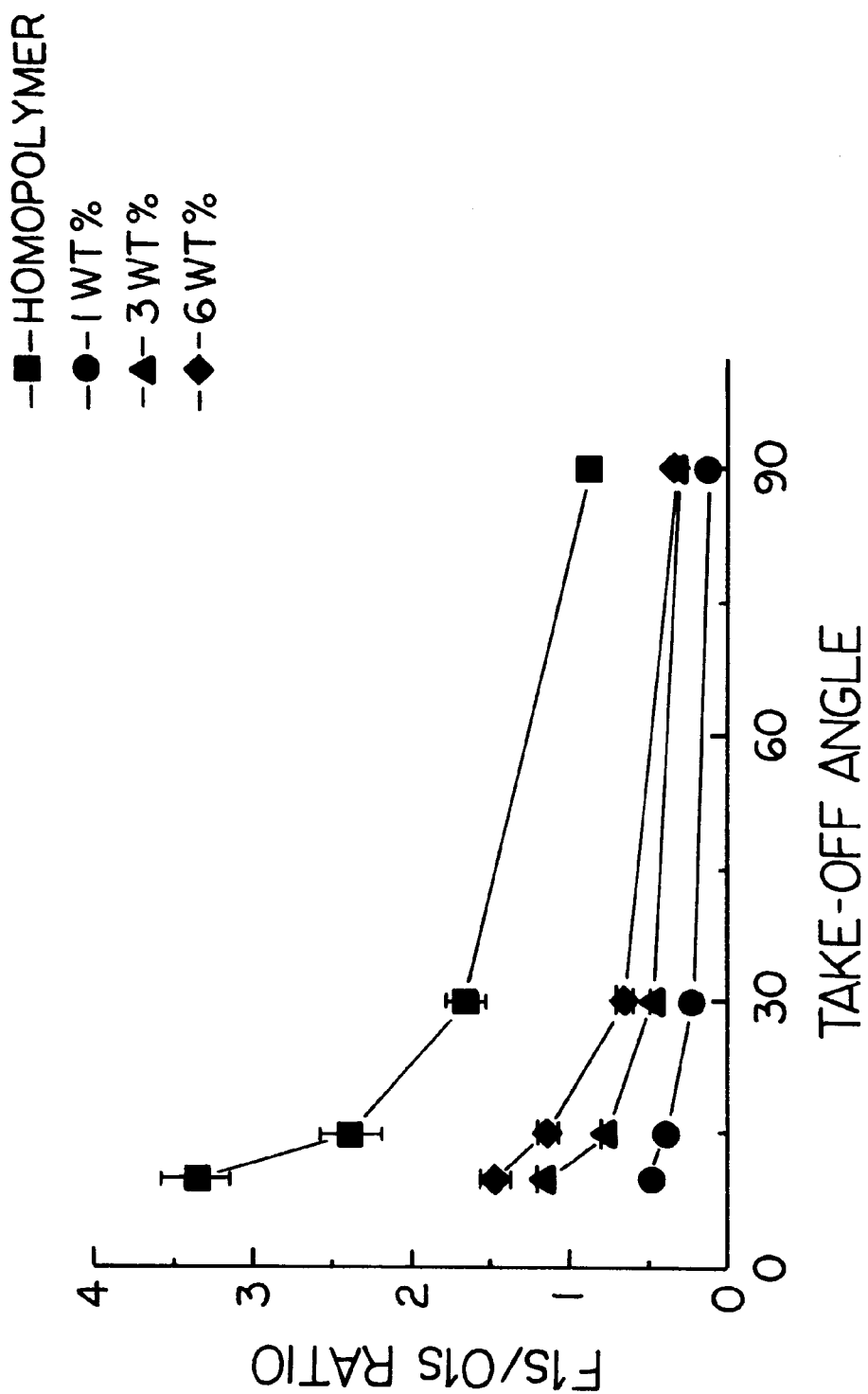
FIGS. 5, 6a and 6b are surface atomic ratios for blended compounds according to the present invention.
Figure 6B:
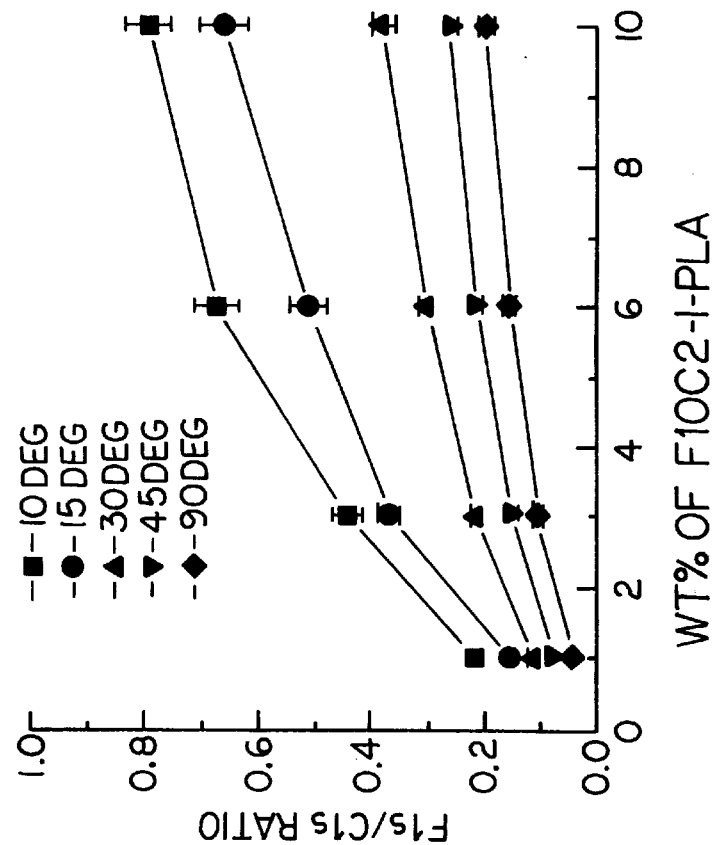
Figure 6A:
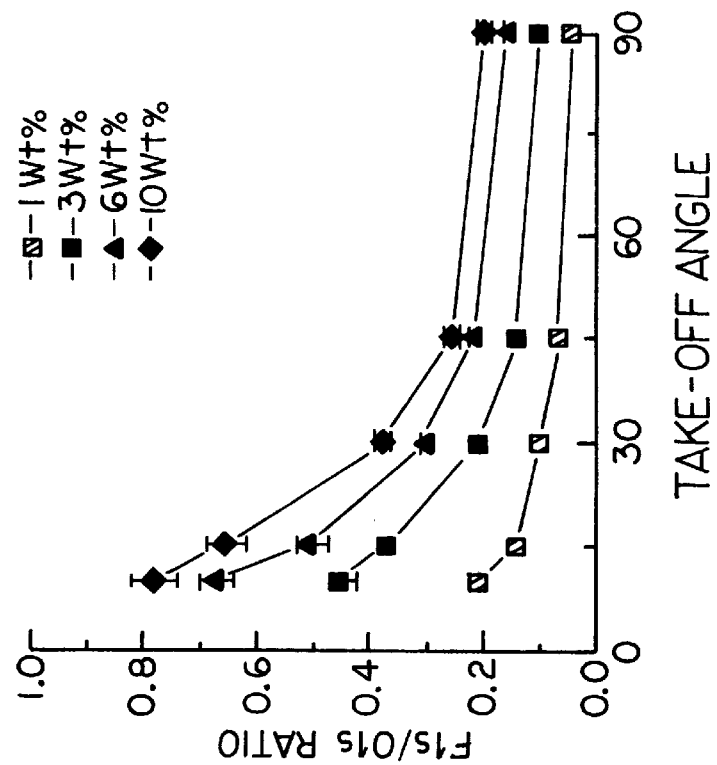
Figure 7:
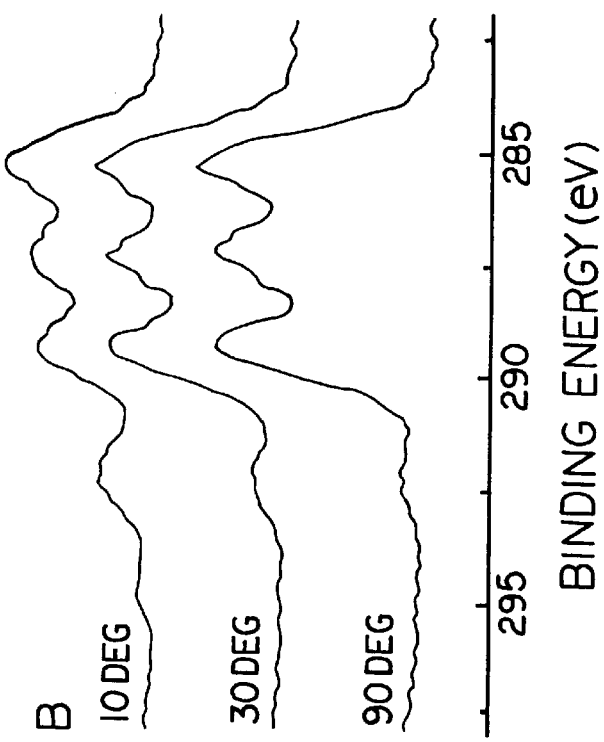
FIGS. 7–10 are ESCA spectra for the compounds of the present invention at various take-off angles.
Figure 7:
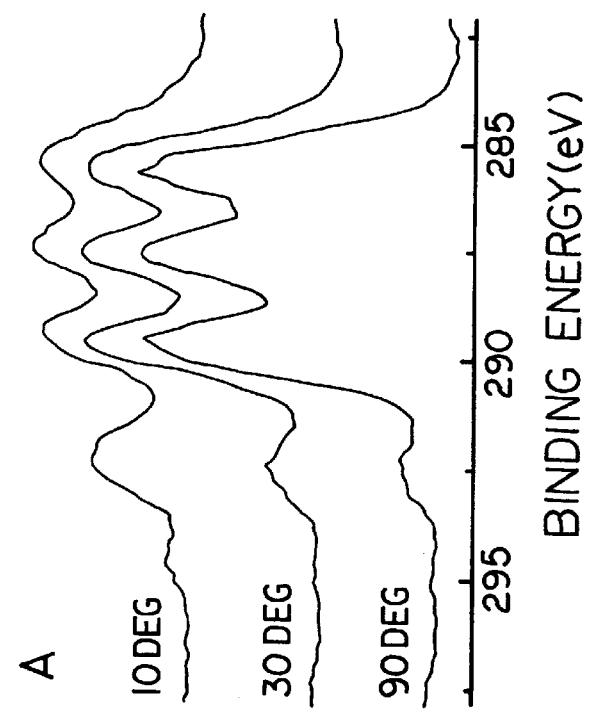
Figure 8:
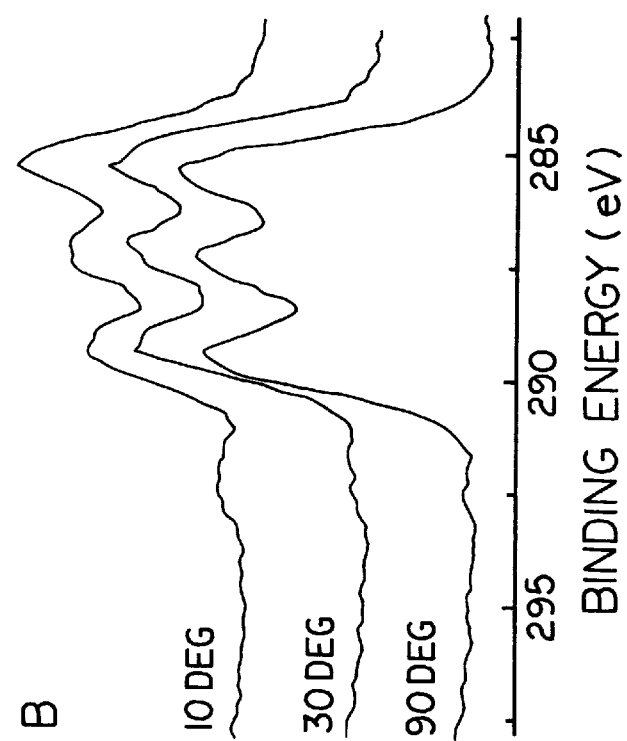
Figure 8:
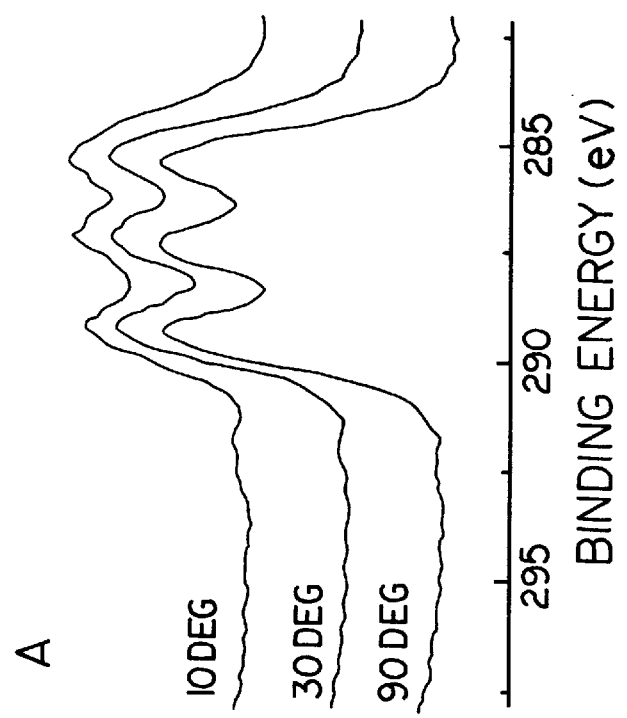
Figure 9:
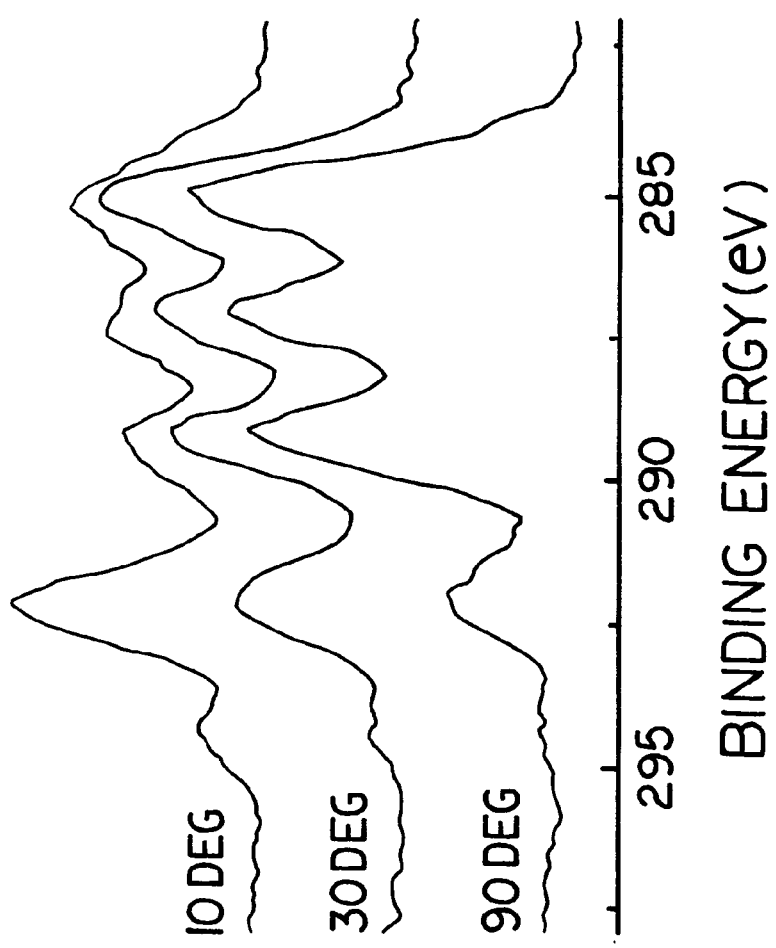
Figure 10:
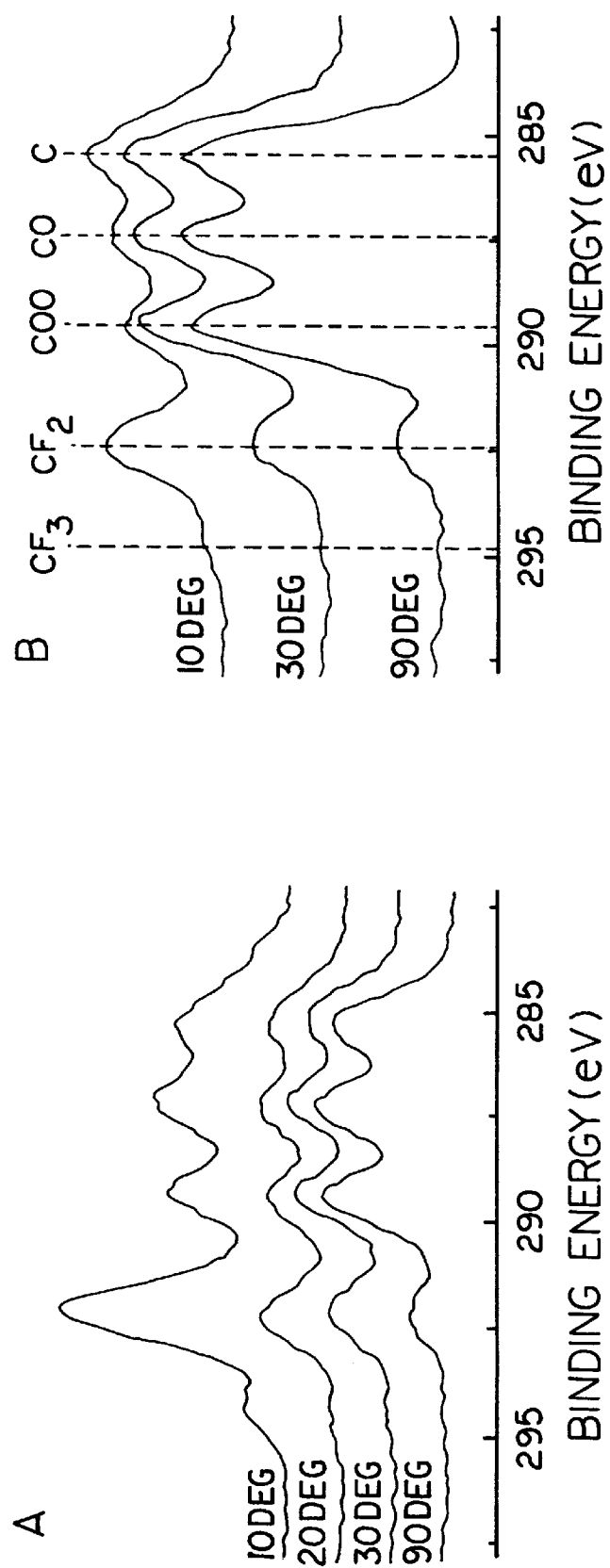

Bulk polymerizations were carried out, in vacuum-sealed glass ampoules at standard temperatures using stannous octoate as a catalyst as illustrated in FIG. 1. Polymerizations of monofluorocarbon (or hydrocarbon)-terminated polyesters were directly initiated with a small amount of pentadecafluoro-1-octanol or decyl alcohol. The hexanediol and pentaerytrithol were used to synthesize multifluorocarbon-terminated polyesters. For synthesis of multifluorocarbon-terminated polyesters, multihydroxy-terminated polyesters were dissolved in dichloromethane and a small amount of triethylamine was added. The reactor was cooled to 0° C. in an ice bath. Pentadecafluorooctanoyl chloride in dichloromethane was slowly dropped. The mixture was reacted at 0° C. for 5 h in an ice bath and at room temperature for 40 h. The solution was washed with aqueous HCl and precipitated in n-hexane.

The overall structure of the materials of the present invention generally can be represented as follows:

XFYCZ-d/l-PA wherein X is the number of fluorocarbon-ended arms and is preferably 1, 2 or 4; Y is the number of fluorine atoms which can be the same or different for each fluorocarbon-ended arm; Z is the number of carbon atoms attached to the fluorocarbon chain; and PA is a polyester polymer, preferably, polyglycolic acid, polylactic acid, or poly (lactic-co-glycolic) acid.

Some representative compounds of the present invention are:

2F7C1-dl-PLA wherein 2 is the number of fluorocarbon-ended arms, F7 is the number of fluorocarbons, and C1 is the number of hydrocarbon attached to fluorocarbon, This compound can also be represented as follows:

{CF$_3$ (CF$_2$)$_6$CH$_2$-dl-PLA-CH$_2$ (CF$_2$)$_6$CF$_3$}

Some other compounds of the present invention include, and not necessarily limited to, F7C1-dl-PLA; F7C1-l-PLA; 2F7-l-PLA; 4F7-l-PLA; and F10C2-l-PLA.

Figure 11B:
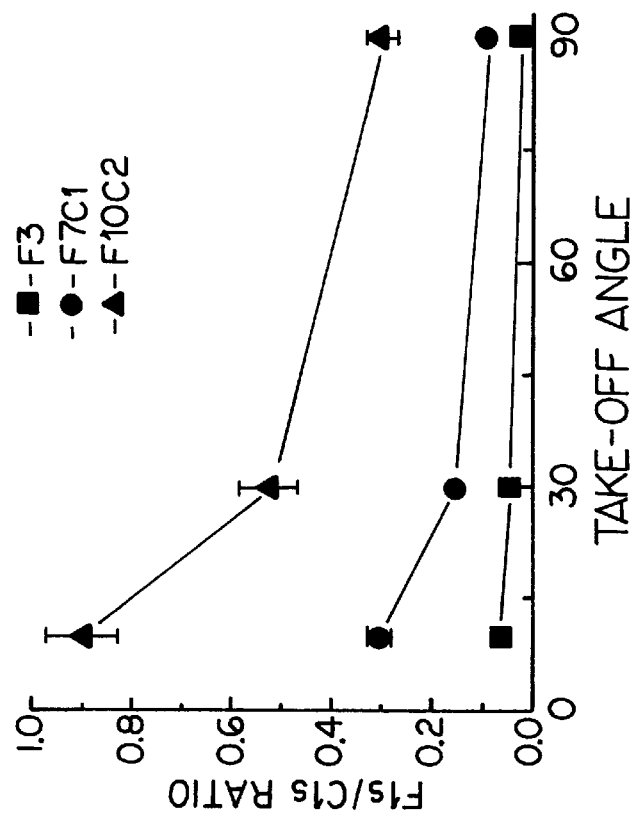
FIGS. 11a and 11b are a representation of the effect of length of the fluorocarbon-capped group on the atomic ratios.
Figure 11A:
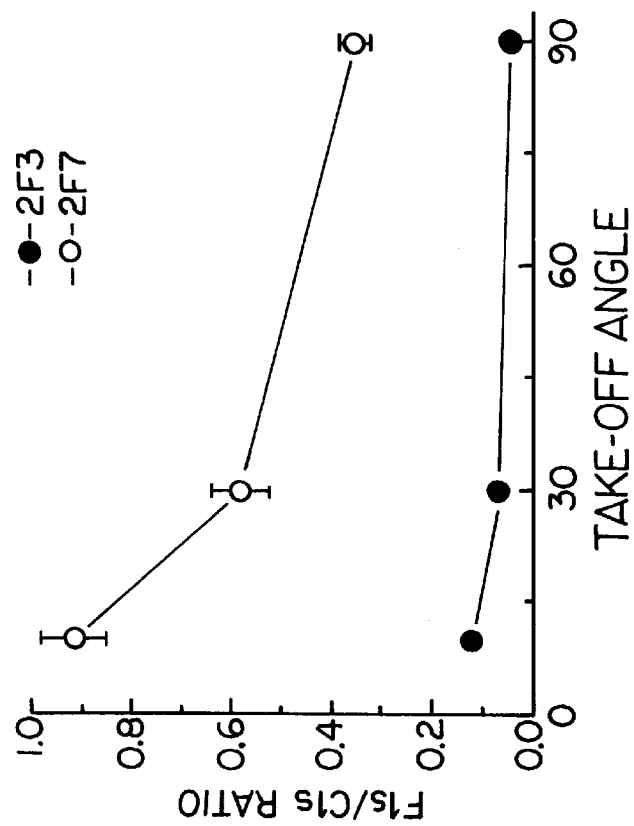
Figure 12B:
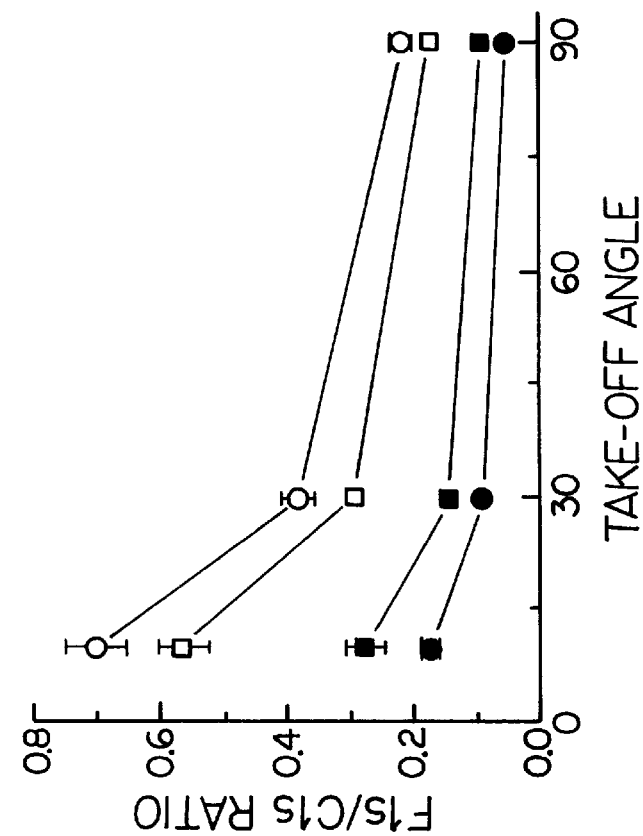
FIGS. 12a and 12b is an illustration of the effect of PLA stereoisomer and molecular weight on atomic ratios of the compounds of the present invention.
Figure 12A:
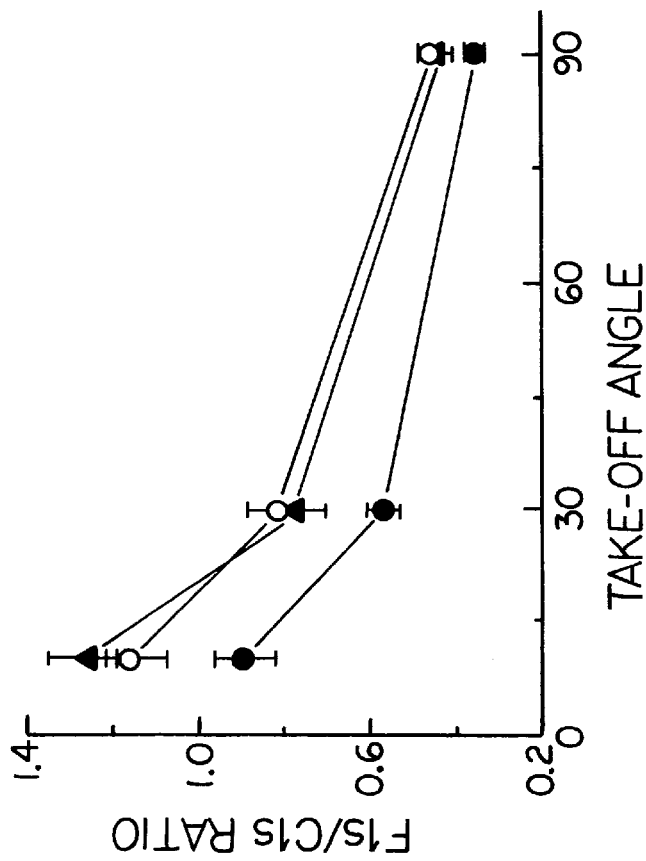

Some compounds of the present invention are illustrated in FIGS. 1–3. The surface chemical compositions of the fluorocarbon end-capping polyesters were obtained by Electron Spectroscopy for Chemical Analysis (ESCA) using Perkin Elmer Physical Electronic Model 530 ESCA. ESCA measurements were performed with MgKa X-ray source at 15 kV and 20 mA. High resolution scans of the C1s, F1s, and O1s were acquired at takeoff angles of 10, 30 and 90. The results are presented in FIGS. 2–10. Thus, FIGS. 2b–2m show surface composition for the structure of FIG. 2a, and FIGS. 3b–3j show surface data for the structure of FIG. 3a. FIG. 11 illustrates the effect of length of fluorocarbon-ended groups on the surface composition, while FIG. 12 illustrates the effect of the molecular weight and the stereoisomer of PLA on the surface composition of the compounds of the present invention.

Figure 13B:
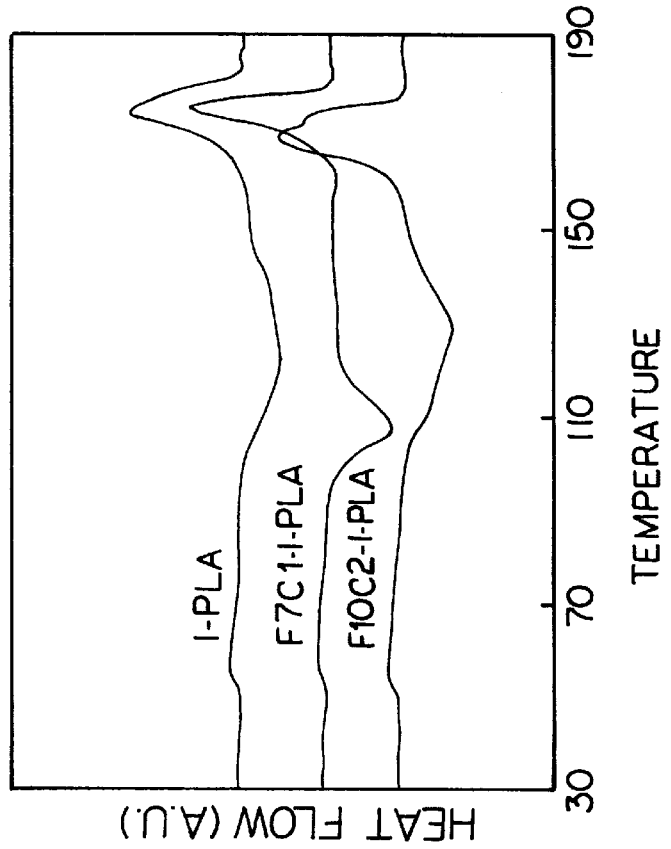
FIGS. 13a, 13b and 14 are DSC curves for the compounds of the present invention.
Figure 13A:
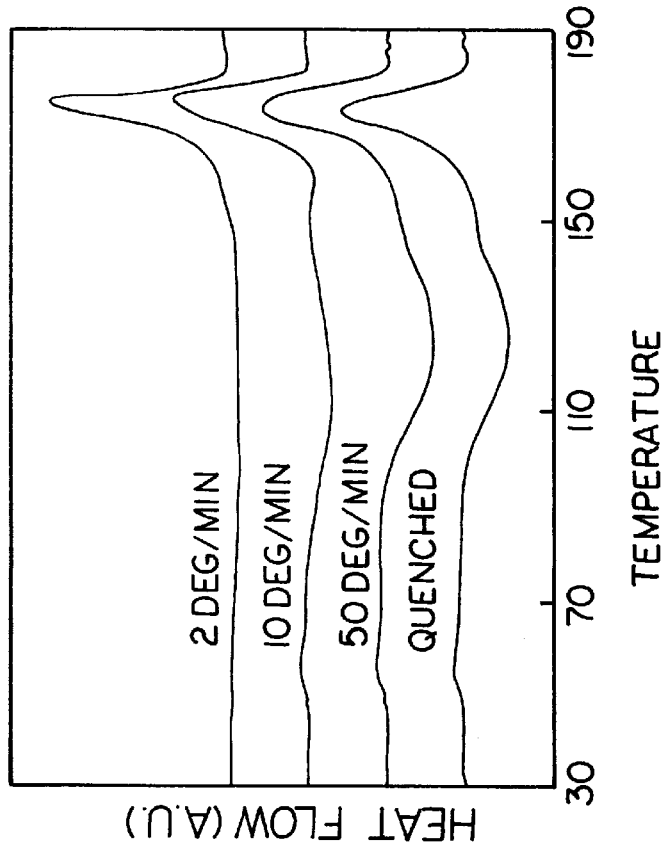
Figure 14:
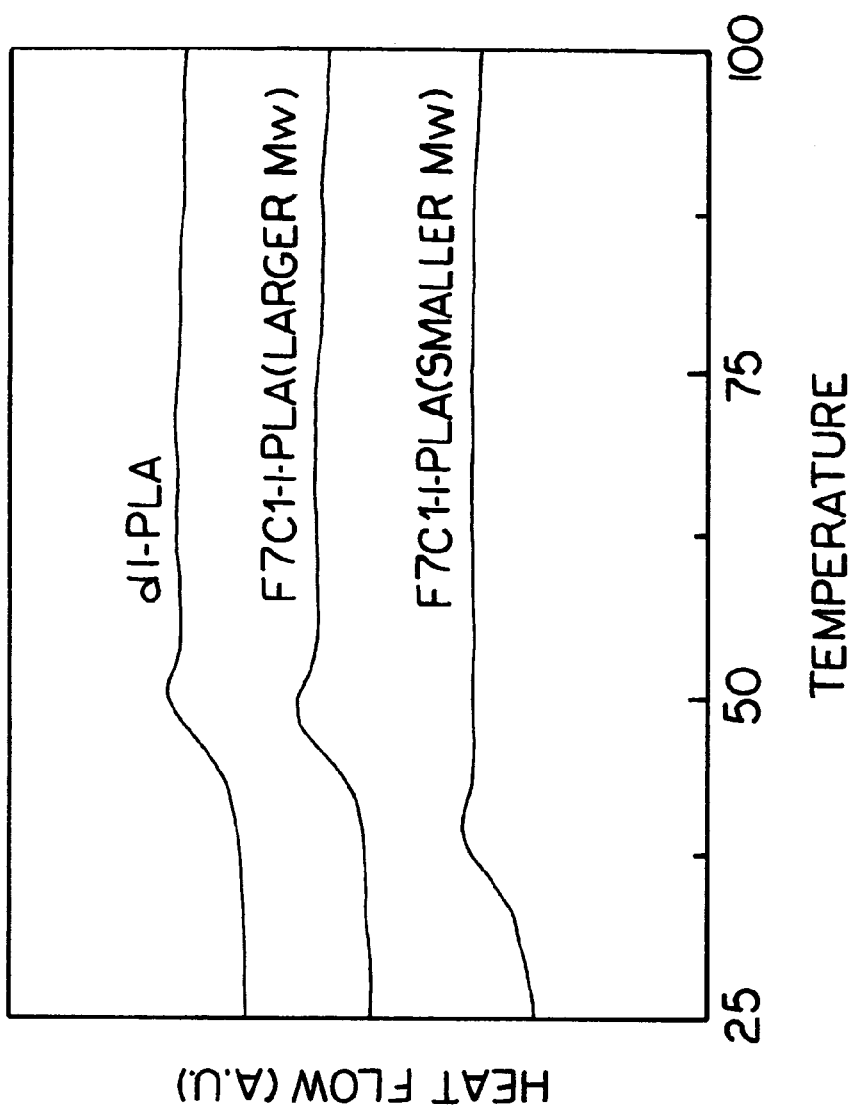
Figure 15:
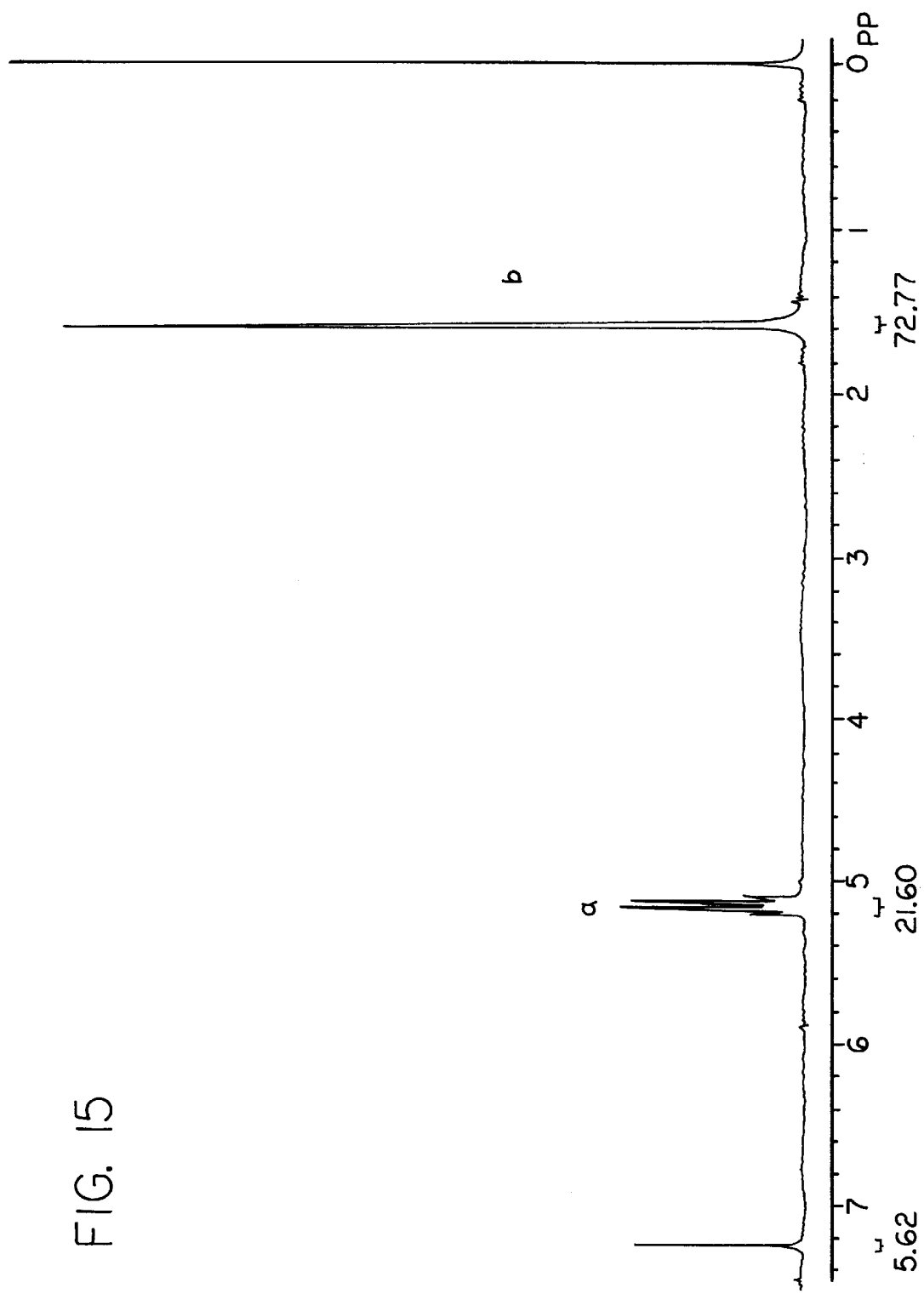
FIGS. 15–18 are representations of $^1$HNMR spectra for the compounds of the present invention.
Figure 16:
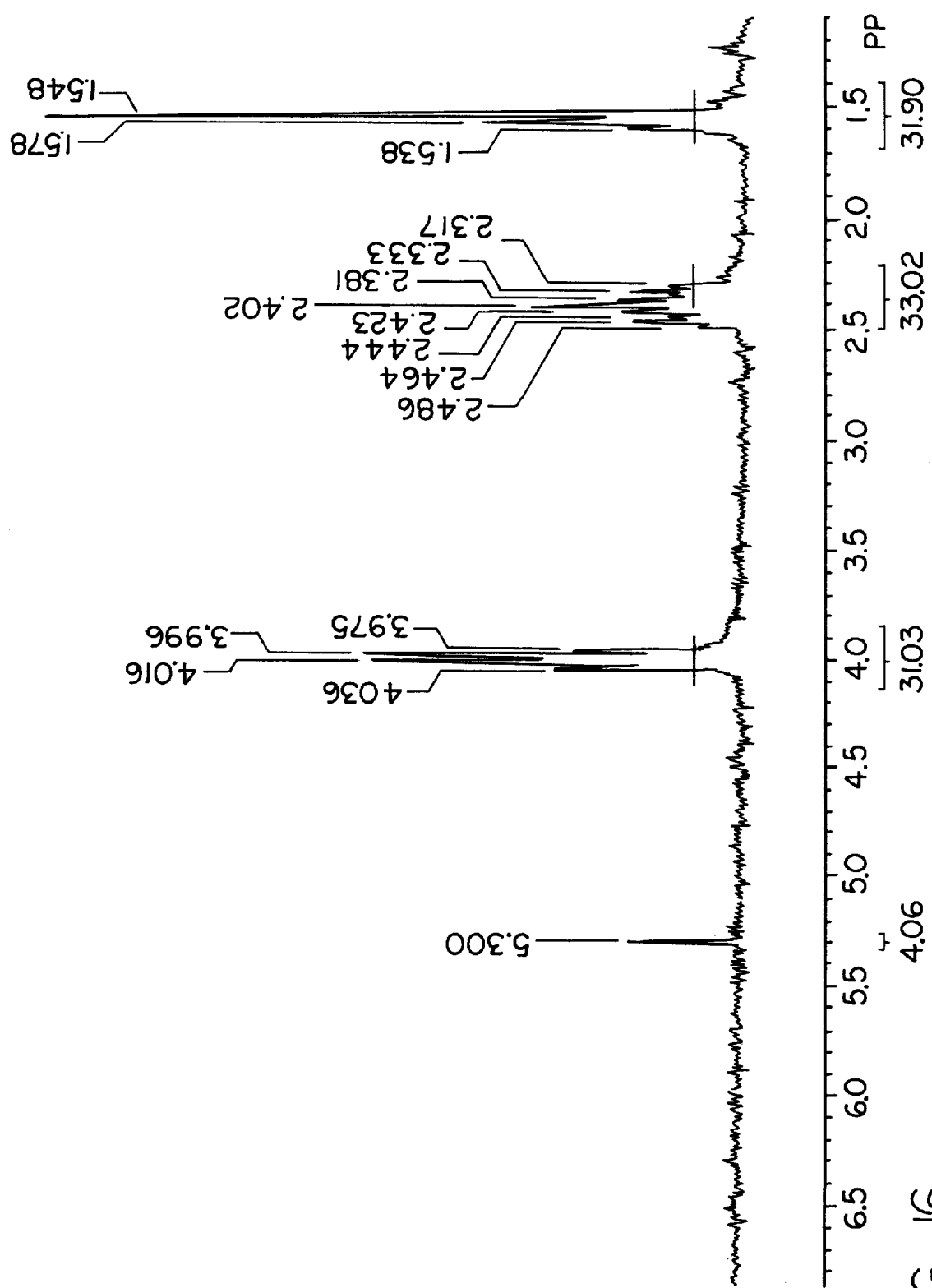
Figure 17:
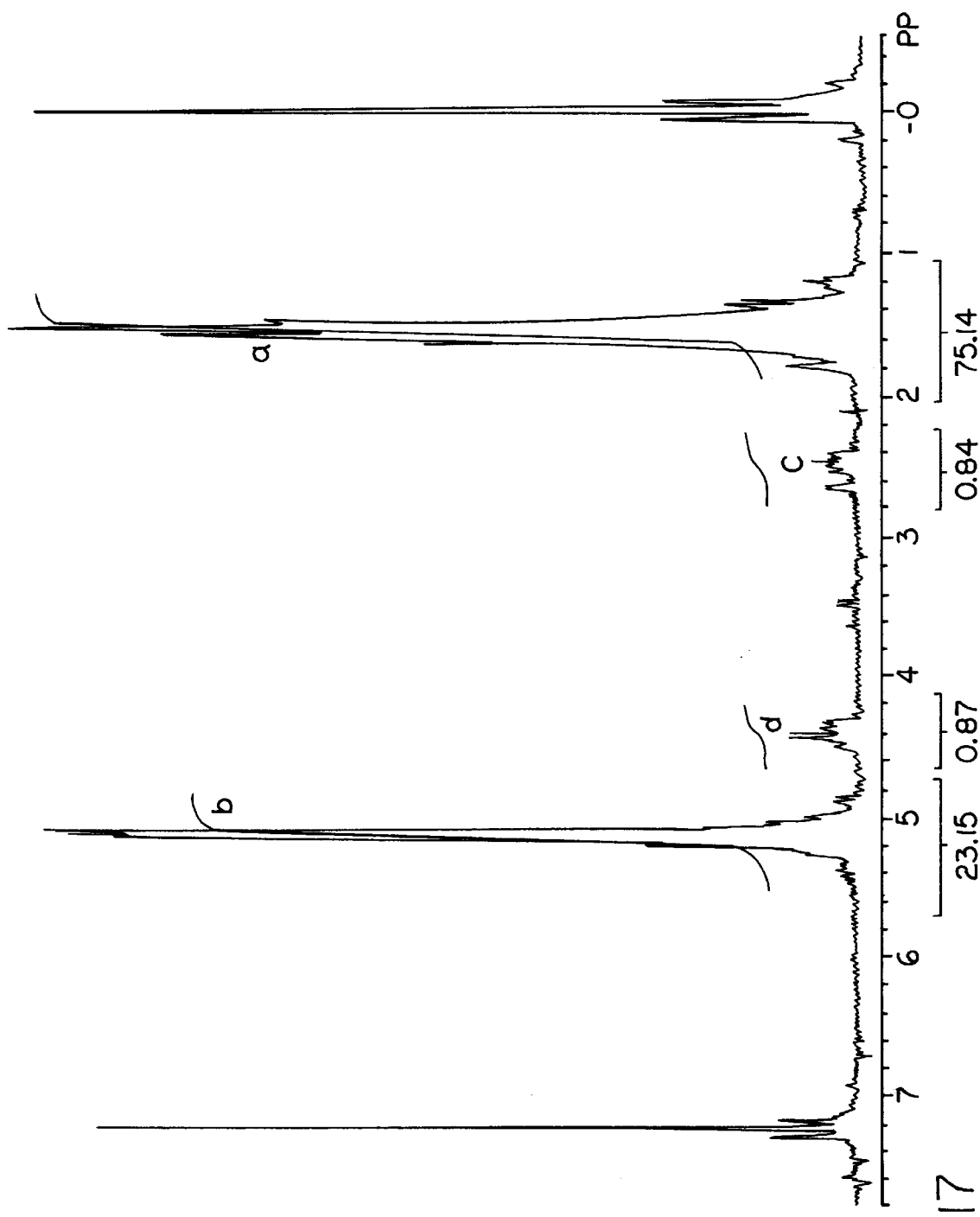
Figure 18:
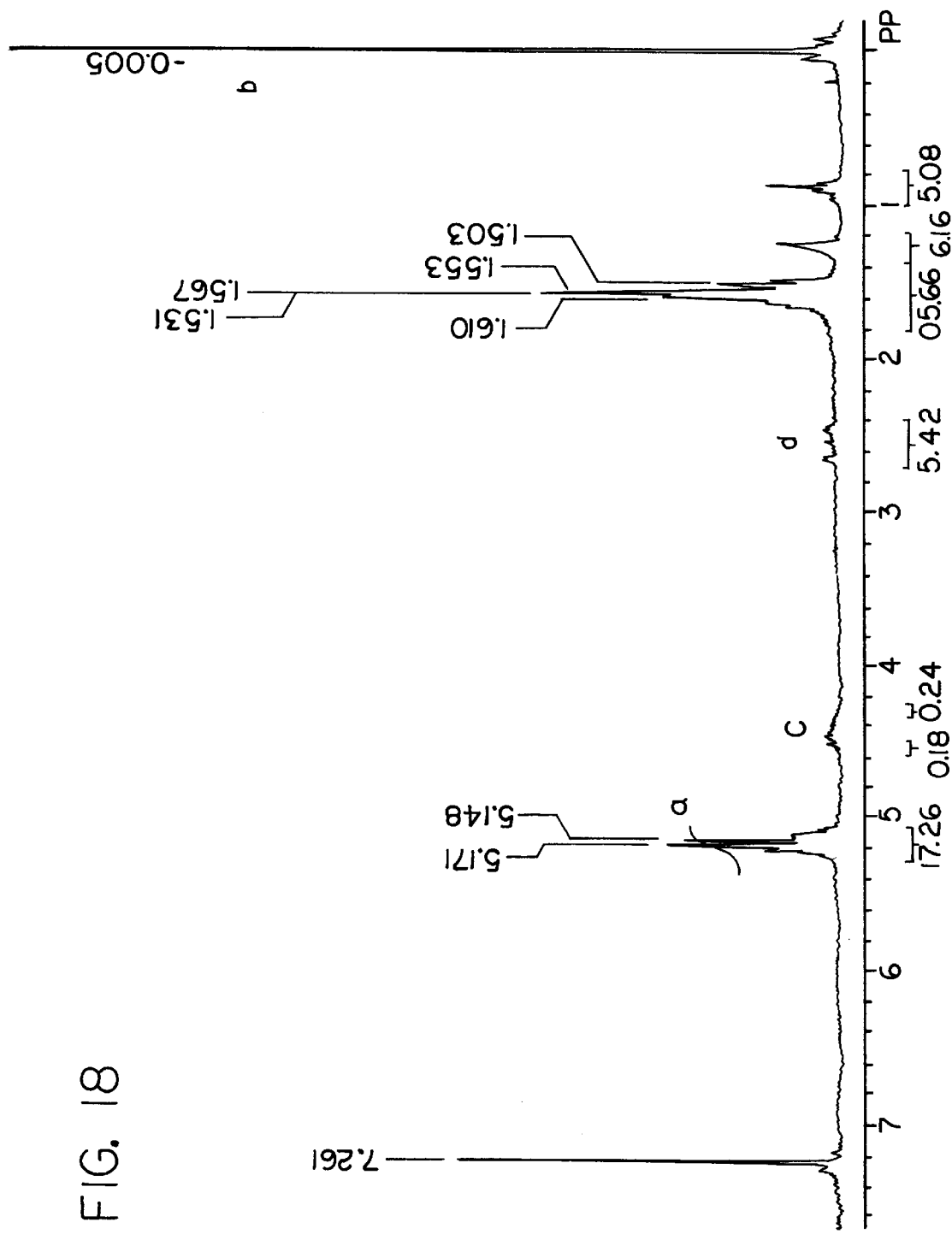
Figure 19:
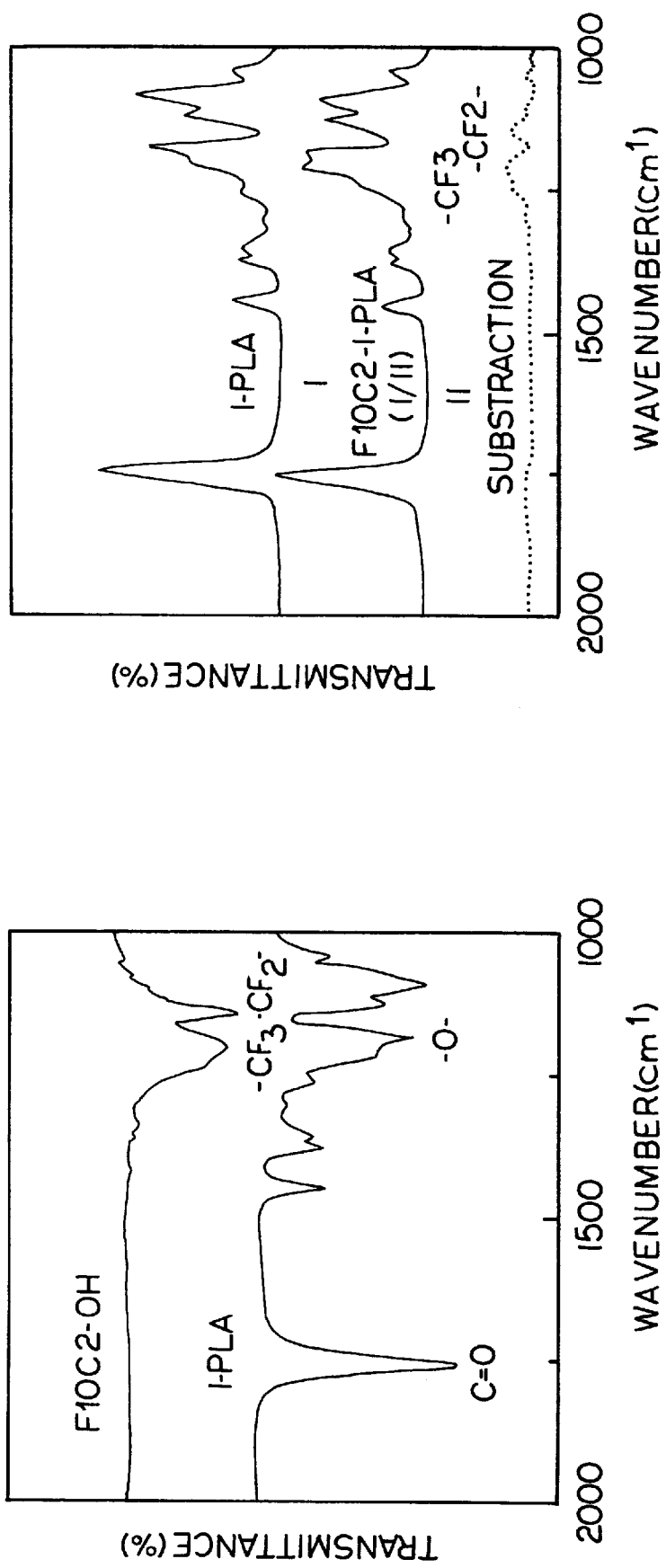
FIGS. 19–22 are representations of IR spectra for some compounds of the present invention.
Figure 20:
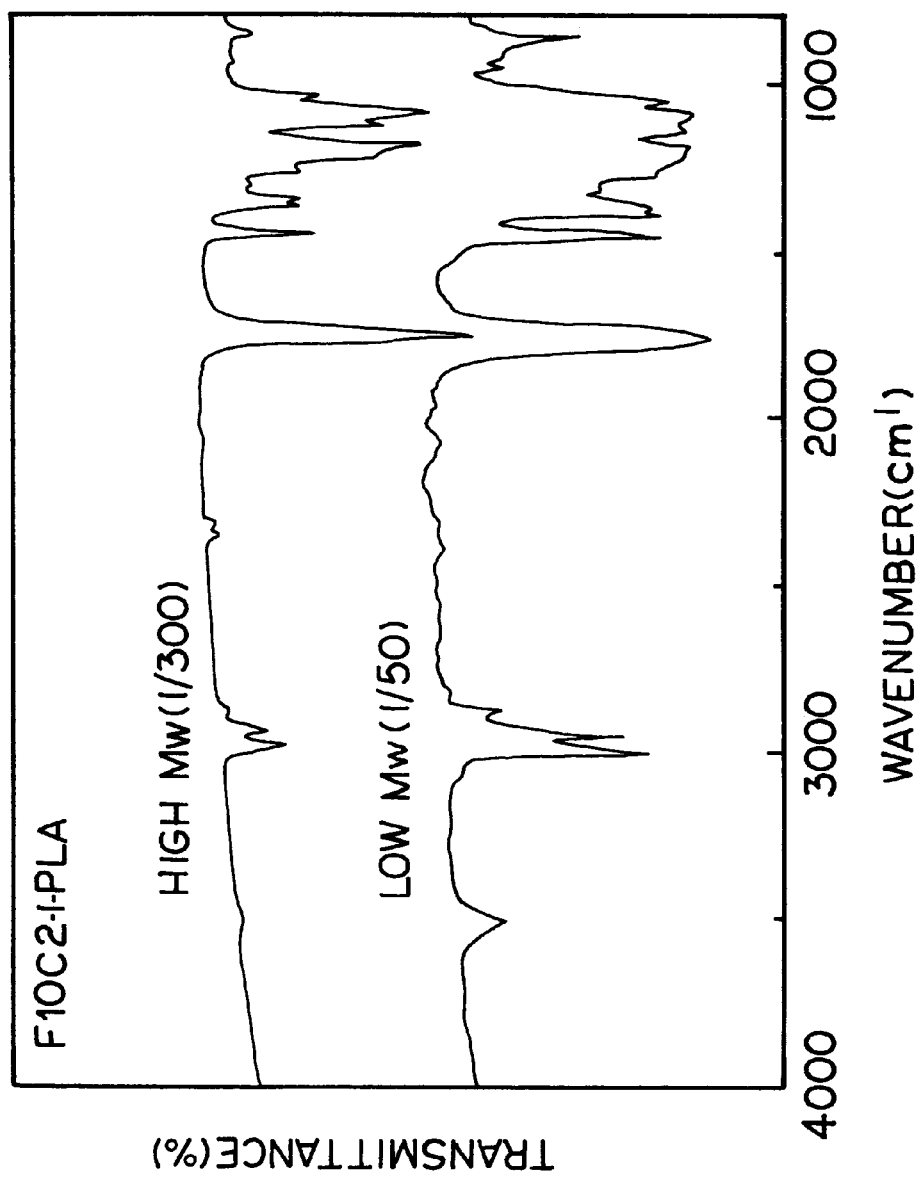
Figure 21:
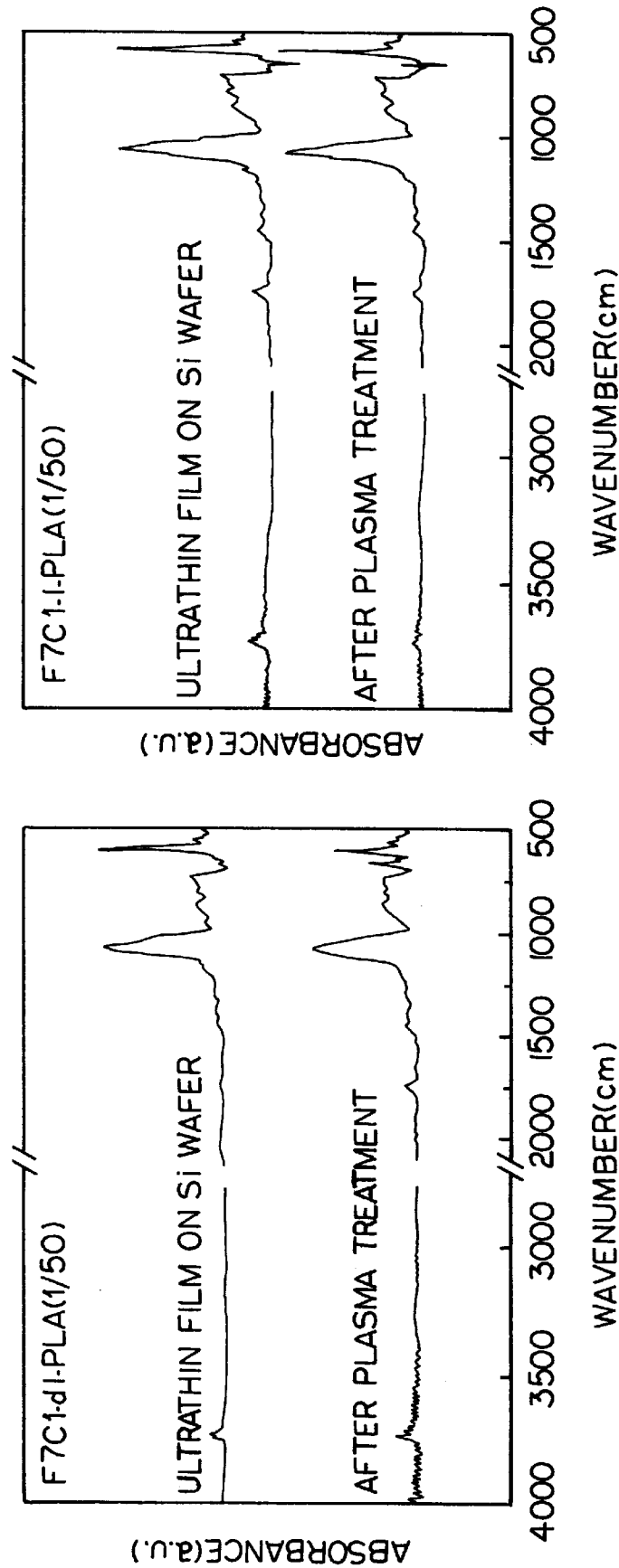
Figure 21A:
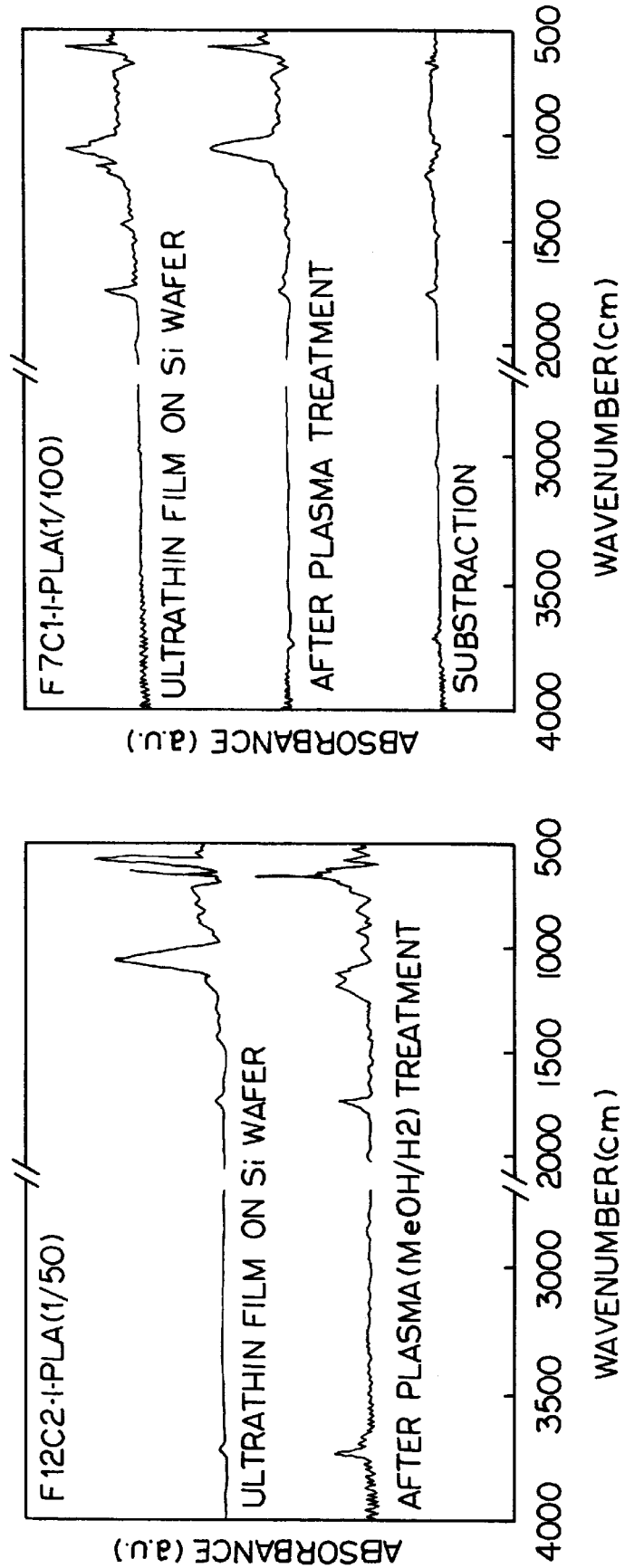
Figure 22:
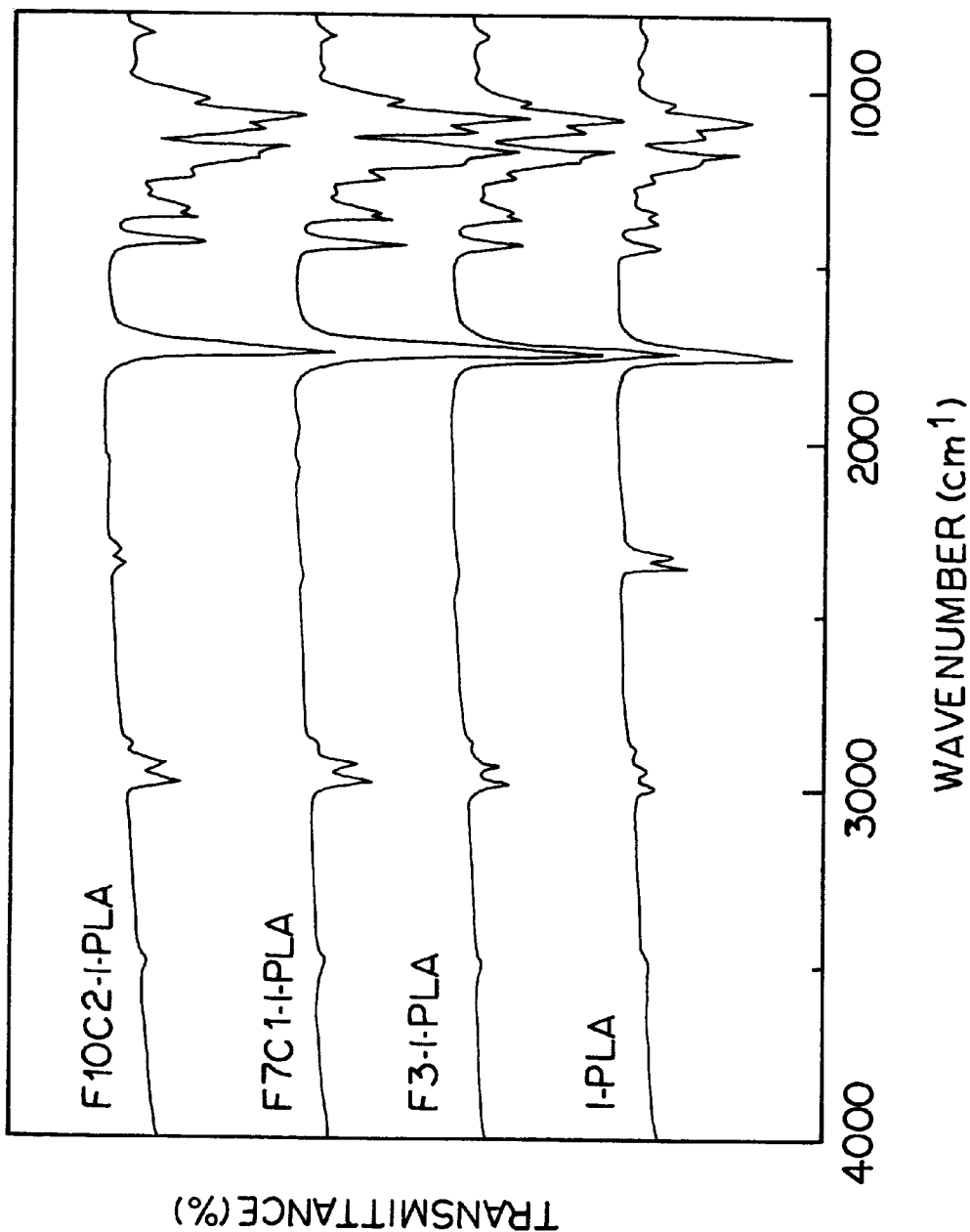

Thermal analysis was carried out by Differential Scanning Calorimeter (DSC) measurements using a Perkin Elmer DSC7 calibrated pure indium. The melting temperature (Tm) was taken at the maximum of the melting peak. The heating rate was 20° C./min in all cases. Samples were cooled at 2° C., 10° C., at a rate of 50° C./min. The results of these experiments are shown in FIGS. 13 and 14.

Further, $^1$H-NMR studies were carried out to determine the composition of the fluorocarbon capped polymers. These results are shown in FIGS. 15–18.

Infrared spectra of the compounds of the present invention are presented in FIGS. 19–22.

These data show that the compounds of the present invention have fluorocarbon chains at the ends of polyesters. It is considered that the fluorocarbon overlayer dominates the surface properties of the material. This efficient refunctionalization of the surface with fluorocarbons produces a surface with bulk properties controlled by the characteristics of the PGA, PLA or PLGA material, including degradation kinetics and the like.

The fluorocarbon end-capped polymers of the present invention can be used in controlled drug release materials, membranes where initial release of lactic or glycolic acid might induce infection or other biologically undesirable responses. These materials can also be refunctionalized with cell adhesive proteins or peptides.

From the foregoing, it will be obvious to those skilled in the art the various modifications in the above-described methods, and compositions can be made without departing from the spirit and scope of the invention. Accordingly, the invention may be embodied in other specific forms without departing from the spirit or essential characteristics thereof. Present examples and embodiments, therefore, are to be considered in all respects as illustrative and not restrictive, and all changes which come within the meaning and range of equivalency of the specifications are therefore intended to be embraced therein.

We claim:

1. A biodegradable polymer comprising $_x$(F$_y$C$_z$) –d/l–PA wherein X is the number of fluorocarbon-ended arms;
   Y is the number of fluorine atoms in the fluorocarbon-ended arms;
   Z is the number of carbon atoms in the fluorocarbon-ended arms;
   if X is greater than 1, then the values of Y and Z can be the same or different for each fluorocarbon-ended arm; and
   PA is selected from the group consisting of polyglycolic acid, polylactic acid, and poly(lactic-co-glycolic) acid.

2. The biodegradable polymer of claim 1 wherein X is 1, 2 or 4.

3. The biodegradable polymer of claim 1 wherein Z is up to 18.

4. The biodegradable polymer of claim 1 wherein Z ranges from 7 to 10.

5. A biodegradable polymer comprising $_x$(F$_y$C$_z$) –d/l–PA wherein X is the number of fluorocarbon-ended arms;
   Y is the number of fluorine atoms in the fluorocarbon-ended arms;
   Z is the number of carbon atoms in the fluorocarbon-ended arms;
   if X is greater than 1, then the values of Y and Z can be the same or different for each fluorocarbon-ended arm; and
   PA is a polyester polymer.

6. The biodegradable polymer of claim 5 wherein X is 1, 2 or 4.

7. The biodegradable polymer of claim 5 wherein Z is up to 18.

8. The biodegradable polymer of claim 5 wherein Z ranges from 7 to 10.

9. The biodegradable polymer of claim 5 wherein the polyester polymer is selected from the group consisting of polyglycolic acid, polylactic acid, and poly(lactic-co-glycolic) acid.

10. The biodegradable polymer of claim 5 wherein at least one of the fluorocarbon-ended arms is added to the biodegradable polymer by a ring opening polymerization method.

11. The biodegradable polymer of claim 5 wherein at least one of the fluorocarbon-ended arms is added to the biodegradable polymer by an insertion/substitution at a terminal hydroxyl group of the polyester polymer.

12. A method to form a biodegradable polymer comprising the steps of:
   providing a polyester polymer selected from the group consisting of a polyester polymer having a terminated hydroxyl group and a polyester ring conformation;
   modifying the polyester polymer by adding at least one fluorocarbon group to the terminal end of the polyester polymer and the fluorocarbon group has the formula F$_y$C$_z$ wherein Y is the number of fluorine atoms in the fluorocarbon group and Z is the number of carbon atoms in the fluorocarbon group;

resulting in the formation of a fluorocarbon end-capped polymer having a refunctionalization of the polyester polymer to have greater low water wettability.

13. The method of claim 12 wherein the fluorocarbon end-capped polymer has the formula of

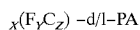

$$_X(F_YC_Z) - d/l - PA$$

wherein X is the number of fluorocarbon-ended arms;

Y is the number of fluorine atoms in the fluorocarbon-ended arms;

Z is the number of carbon atoms in the fluorocarbon-ended arms;

if X is greater than 1, then the values of Y and Z can be the same or different for each fluorocarbon-ended arm;

and

PA is a polyester polymer.

14. The method of claim 13 wherein X is 1, 2 or 4.

15. The method of claim 13 wherein Z is up to 18.

16. The method of claim 13 wherein Z ranges from 7 to 10.

17. The method of claim 13 wherein the polyester polymer is selected from the group consisting of polyglycolic acid, polylactic acid, and poly(lactic-co-glycolic) acid.

18. The method of claim 13 wherein at least one of the fluorocarbon-ended arms is added to the biodegradable polymer by a ring opening polymerization method.

19. The method of claim 13 wherein at least one of the fluorocarbon-ended arms is added to the biodegradable polymer by an insertion/substitution at the terminal hydroxyl group of the polyester polymer.

* * * * *